United States Patent
Lai et al.

(10) Patent No.: US 12,463,521 B2
(45) Date of Patent: Nov. 4, 2025

(54) CURRENT SAMPLING CIRCUIT FOR BRIDGELESS POWER FACTOR CORRECTOR

(71) Applicant: ACBEL POLYTECH INC., New Taipei (TW)

(72) Inventors: Bing-Kun Lai, New Taipei (TW); Cheng-Hsiao Luo, New Taipei (TW); I-Hsiu Lo, New Taipei (TW)

(73) Assignee: ACBEL POLYTECH INC., New Taipei (TW)

( * ) Notice: Subject to any disclaimer, the term of this patent is extended or adjusted under 35 U.S.C. 154(b) by 204 days.

(21) Appl. No.: 18/388,195

(22) Filed: Nov. 9, 2023

(65) Prior Publication Data
US 2025/0023441 A1 Jan. 16, 2025

(30) Foreign Application Priority Data
Jul. 13, 2023 (TW) .................................. 112126264

(51) Int. Cl.
*H02M 1/42* (2007.01)
*H02M 1/00* (2006.01)

(52) U.S. Cl.
CPC ....... *H02M 1/0009* (2021.05); *H02M 1/4241* (2013.01)

(58) Field of Classification Search
CPC . H02M 1/0009; H02M 1/4241; H02M 1/4233
See application file for complete search history.

(56) References Cited

U.S. PATENT DOCUMENTS

| | | | |
|---|---|---|---|
| 10,122,262 B1* | 11/2018 | Wang | H02M 1/4233 |
| 2009/0230929 A1* | 9/2009 | Sui | H02M 1/4208 |
| | | | 323/207 |
| 2013/0188405 A1* | 7/2013 | Jin | H02M 7/217 |
| | | | 363/49 |
| 2016/0241132 A1* | 8/2016 | Lin | H02M 1/4225 |
| 2021/0344278 A1 | 11/2021 | Davare et al. | |
| 2022/0014092 A1 | 1/2022 | Ren et al. | |
| 2024/0275259 A1* | 8/2024 | Zeng | G01R 19/32 |

FOREIGN PATENT DOCUMENTS

| | | |
|---|---|---|
| CN | 102520232 A | 6/2012 |
| CN | 212367124 U | 1/2021 |
| CN | 110365203 B | 7/2021 |
| CN | 113067458 A | 7/2021 |

* cited by examiner

*Primary Examiner* — Kyle J Moody
(74) *Attorney, Agent, or Firm* — WPAT, PC

(57) ABSTRACT

A current sampling circuit for a bridgeless power factor corrector is provided. The current sampling circuit comprises a sampling resistor, a first and second current sampling modules. In the first and second current sampling modules, primary windings of transformers are respectively serially connected to a first and second fast switches of the bridgeless power factor corrector. In a positive half cycle of the AC power, a second sampled current phase switching unit is turned on to form a second sampling circuit, and a first main current freewheeling unit is turned on to form a freewheeling path of a first transformer. In a negative half cycle of the AC power, a first sampled current phase switching unit is turned on to form a first sampling circuit, and a second main current freewheeling unit is turned on to form a freewheeling path of a second transformer.

10 Claims, 24 Drawing Sheets

CURRENT SAMPLING CIRCUIT FOR BRIDGELESS POWER FACTOR CORRECTOR

CROSS-REFERENCE TO RELATED APPLICATIONS

This application claims the priority benefit of TW application serial No. 112126264 filed on Jul. 13, 2023. The entirety of the above-mentioned patent application is hereby incorporated by reference herein and made a part of specification.

BACKGROUND OF THE INVENTION

1. Field of the Invention

The present invention relates to a current sampling circuit, and more particularly to a current sampling circuit for a bridgeless power factor corrector.

2. Description of the Related Art

In order to improve an operation efficiency, a main power converter is mostly composed of a power factor corrector (PFC) circuit and a resonant converter (such as an LLC converter). The bridgeless PFC is a main development project of the PFC circuit, such as a traditional bridgeless PFC, a bidirectional switch bridgeless PFC, a Dual boost bridgeless PFC, a totem-pole bridgeless PFC, etc. A common feature of the bridgeless PFCs is that current paths of the input power are different in a positive half cycle and a negative half cycle of an AC power. The following description takes the totem-pole bridgeless PFC as an example.

With reference to FIGS. 17A to 17D, the totem-pole bridgeless PFC includes a first fast switch Q1', a second fast switch Q2', a first slow switch Q3', a second slow switch Q4', an output capacitor Co' and a magnetizing inductance Lm'. The first fast switch Q1' and the second fast switch Q2' are high speed switch, and controlled by a pulse width modulation (PWM) control signal. The first fast switch Q1' and the second fast switch Q2' are connected in series to form a fast arm. The first slow switch Q3' and the second slow switch Q4' are connected in series to form a slow arm. The fast arm and the slow arm are respectively connected to an output capacitor Co' in parallel. A connection point of the first fast switch Q1' and the second fast switch Q2' is connected to one end of the magnetizing inductance Lm'. A connection point of the first slow switch Q3' and the second slow switch Q4' is connected to a neutral terminal of an AC power.

With reference to FIG. 17A, when the AC power operates in an energy storage period of the positive half cycle, the first fast switch Q1' and the first slow switch Q3' are turned off and the second fast switch Q2' and the second slow switch Q4' are turned on. A current flows through the magnetizing inductance Lm', the second fast switch Q2' and the second slow switch Q4' to form an energy storage circuit. With reference to FIG. 17B, when the AC power operates in an energy release period of the positive half cycle, the second fast switch Q2' and the first slow switch Q3' are turned off and the first fast switch Q1' and the second slow switch Q4' are turned on. A current flows through the magnetizing inductance Lm', the first fast switch Q1' and the second slow switch Q4' to form an energy release circuit.

With reference to FIG. 17C, when the AC power operates in the energy storage period of the negative half cycle, the second fast switch Q2' and the second slow switch Q4' are turned off and the first fast switch Q1' and the first slow switch Q3' are turned on. A current flows through the magnetizing inductance Lm', the first fast switch Q1' and the first slow switch Q3' to form an energy storage circuit. With reference to FIG. 17D, when the AC power operates in the energy release period of the negative half cycle, the first fast switch Q1' and the second slow switch Q4' are turned off and the second fast switch Q2' and the first slow switch Q3' are turned on. A current flows through the magnetizing inductance Lm', the second fast switch Q2' and the first slow switch Q3' to form an energy release circuit.

In the bridgeless totem-pole PFC, the current has different current paths of energy storage and energy release in the positive half cycle and the negative half cycle of the AC power, so two current sampling circuits are required to sample different current paths respectively.

With reference to FIG. 18, the bridgeless totem-pole PFC further includes two current sampling circuits 40,50. In the two current sampling circuits, primary windings of transformers T1', T2' are serially connected to the first fast switch Q1' and the second fast switch Q2' respectively to sense a current flowing through the first fast switch Q1 and the second fast switch Q2 respectively. The current sampling circuit further includes sampling resistor RL1, RL2, demagnetizing units 42,52 and sampled-freewheeling switching units 41, 51 which are connected to secondary windings of the transformers T1', T2'. Action timings of the transformer T2' and the transformer T1' are opposite in the positive half cycle and the negative half cycle. Action principles of the transformer T2' and the transformer T1' are the same. Therefore, only actions of transformer T1' during one complete cycle will be explained below.

FIG. 19A shows a current path of the current sampling circuits 40 when the AC power operates in the negative half cycle and the magnetizing inductance Lm' is in the energy storage period. FIG. 19B shows a current path of the current sampling circuits 40 when the AC power operates in the negative half cycle and the magnetizing inductance Lm' is in the energy release period. With reference to FIG. 19A, in the energy storage period, when an energy storage current flows through the primary windings of the transformer T1', a switch S1' of the sampled-freewheeling switching units 41 is turned on and the current mapped to the secondary winding of the transformer T1' is sampled through the sampling resistor RL1. With reference to FIG. 19B, in the energy release period, there is no current flow through the primary winding of the transformer T1', the switch S1' of the sampled-freewheeling switching units 41 is turned off and an energy stored in the transformer T1' is discharged through a current path formed by the demagnetizing units 42.

FIG. 19C shows a current path of the current sampling circuits 40 when the AC power operates in the positive half cycle and the magnetizing inductance Lm' is freewheeling. FIG. 19D shows a current path of the current sampling circuits 40 when the AC power operates in the positive half cycle and the magnetizing inductance Lm' is demagnetizing. When a freewheeling current flows through the primary windings of the transformer T1' in a reverse direction, the switch S1' is turned on and the freewheeling current is mapped to the secondary winding of the transformer T1' and flows through the sampled-freewheeling switching units 41. When the magnetizing inductance Lm' is in the energy storage period, the switch S1' is turned off and the freewheeling current stored in the transformer T1' is discharged through a current path formed by the demagnetizing units 42.

It can be seen that the current sampling circuit of the conventional bridgeless PFC has some shortcomings. The bridgeless PFC uses two A/DCs (including two corresponding sampling resistors) to sample currents in different paths, and the two sampling resistors require two corresponding sampling circuits, making the circuit more complex. The control signal of the switches of the sampling circuits must use the same PWM high-frequency signal as the fast switches in the bridgeless PFC. High-frequency switching not only complicates the control circuit, but also increases the switching loss of the overall circuit in the case of high-speed switching. In addition, it is also necessary to provide additional PWM control signals to the current sampling circuit for the switches switching. Since the PWM control signal is a high-frequency signal, and high-frequency signal pins of the Micro Controller Unit (MCU) are limited, when the current sampling circuit occupies the high-frequency signal pins of the MCU, the number of the high-frequency signal pins available for the MCU is reduced.

In summary, the current sampling circuit of the conventional bridgeless PFC needs to be further improved.

SUMMARY OF THE INVENTION

The conventional bridgeless PFC with two sampling circuits causes higher complexity of the circuit and control signals, occupation of high-frequency input/output (IO) pins of a controller, and higher switching loss of the sampling circuit by using high-frequency PWM control signals to control switches.

To solve the problems of the conventional bridgeless PFC having two current sampling circuits, the present invention provides a current sampling circuit for the bridgeless power factor corrector, which includes a sampling resistor, a first current sampling module, and a second current sampling module.

The current sampling circuit of the present invention is connected to the bridgeless power factor corrector. The bridgeless power factor corrector is electrically connected to an AC power, and has a first fast switch and a second fast switch. An energy storage current flows through the second fast switch in a positive half cycle of the AC power and flows through the first fast switch in a negative half cycle of the AC power.

The first current sampling module includes a first transformer, a first sampled current phase switching unit and a first main current freewheeling unit.

The first transformer includes a first primary winding and a first secondary winding. The first primary winding and the first secondary winding are coupled with each other. The first primary winding and the first fast switch are connected in series. The first secondary winding is connected to the sampling resistor through the first sampled current phase switching unit. The first main current freewheeling unit is connected to the first secondary winding in parallel.

The second current sampling module includes a second transformer, a second sampled current phase switching unit and a second main current freewheeling unit.

The second transformer includes a second primary winding and a second secondary winding. The second primary winding and the second secondary winding are coupled with each other. The second primary winding and the second fast switch are connected in series. The second secondary winding is connected to the sampling resistor through the second sampled current phase switching unit. The second main current freewheeling unit is connected to the second secondary winding in parallel.

In the positive half cycle of the AC power, the second sampled current phase switching unit between the second secondary winding and the sampling resistor is turned on to form a second sampling circuit, and the first main current freewheeling unit is turned on between two ends of the first secondary winding.

In the negative half cycle of the AC power, the first sampled current phase switching unit between the first secondary winding and the sampling resistor is turned on to form a first sampling circuit, and the second main current freewheeling unit is turned on between two ends of the second secondary winding.

The current sampling circuit for the bridgeless power factor corrector of the present invention uses a single sampling resistor. The first sampled current phase switching unit and the second main current freewheeling unit are turned on in the negative half cycle of the AC power to form the first sampling circuit of the first transformer including the sampling resistor and a freewheeling path of the second transformer. Relatively, the second sampled current phase switching unit and the first main current freewheeling unit are turned on in the positive half cycle of the AC power to form the second sampling circuit of the second transformer including the sampling resistor and a freewheeling path of the first transformer.

The turn-on and turn-off of the first sampled current phase switching unit, the second sampled current phase switching unit, the first main current freewheeling unit and the second main current freewheeling unit are based on the half cycle of the AC power, so that control signals of the first sampled current phase switching unit, the second sampled current phase switching unit, the first main current freewheeling unit and the second main current freewheeling unit can use general purpose input/output (GPIO) pins of a controller.

The present invention does not use PWM control signal pins with a same switching frequency as the first fast switch and the second fast switch of the bridgeless PFC, and does not need to occupy the high-frequency IO pins of the controller.

In summary, the current sampling circuit for the bridgeless PFC of the present invention only uses a single sampling resistor to avoid the problem of higher circuit complexity caused by the conventional bridgeless PFC with two sampling circuits. The present invention further reduces a demand for the output pins of the controller and improves the overall design flexibility of the circuit.

DETAILED DESCRIPTION OF THE INVENTION

Figure 1:
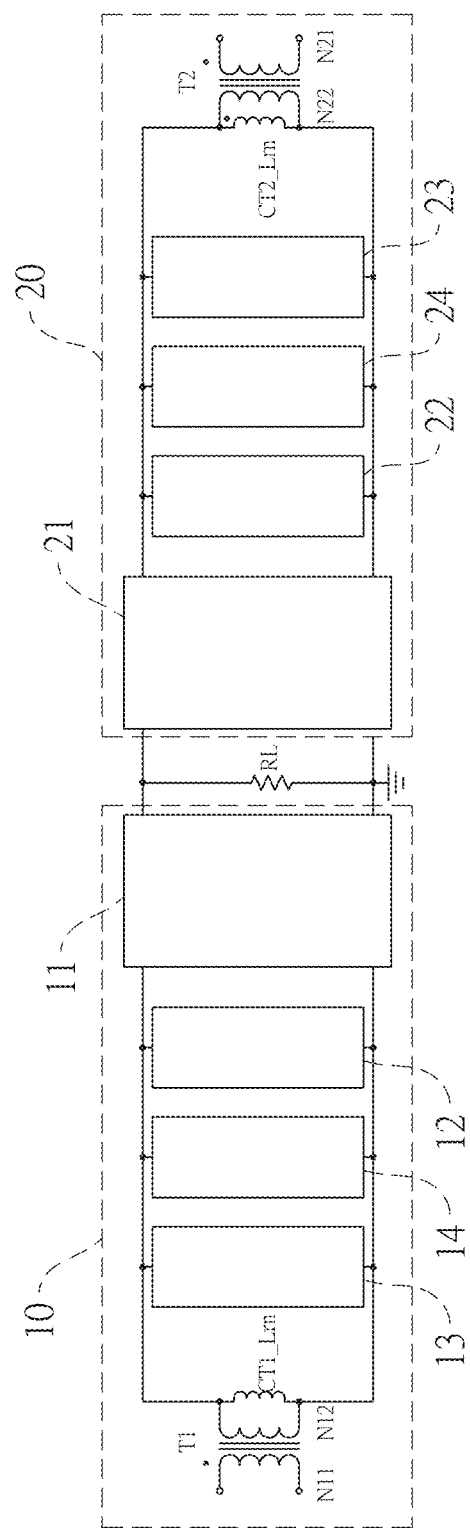
FIG. 1 is a circuit block diagram of the current sampling circuit for the bridgeless power factor corrector.

With reference to FIG. 1, a current sampling circuit for a bridgeless power factor corrector (PFC) includes two current sampling modules 10, 20 and a sampling resistor RL. The current sampling circuit is used to sample the current of two main current paths of the bridgeless PFC. The two current sampling modules 10, 20 of the current sampling circuit are respectively serially connected to two fast switches of the bridgeless PFC and respectively sample the current of the two fast switches through the sampling resistor RL.

Figure 2:
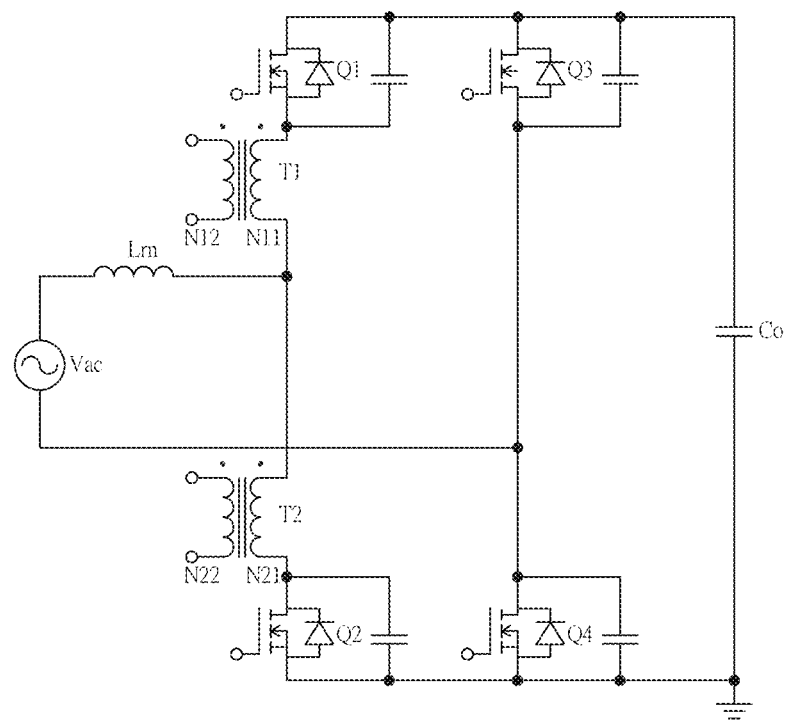
FIG. 2 is a circuit diagram of the bridgeless power factor corrector combined with the current sampling circuit of the present invention.

With reference to FIG. 2, take a bridgeless totem-pole PFC 1, one of the bridgeless PFCs, as an example. The bridgeless totem-pole PFC includes a first fast switch Q1, a second fast switch Q2, a first slow switch Q3, and a second slow switch Q4. The first fast switch Q1 and the second fast switch Q2 are connected in series to form a fast arm. The first slow switch Q3 and the second slow switch Q4 are connected in series to form a slow arm. The fast arm and the slow arm are respectively connected to an output capacitor Co in parallel. A connection point of the first fast switch Q1 and the second fast switch Q2 is connected to an AC terminal of an alternating-current (AC) power through the magnetizing inductance Lm. A connection point of the first slow switch Q3 and the second slow switch Q4 is connected to a neutral terminal of the AC power.

In the following description, the current sampling module sampling the first fast switch Q1 of the bridgeless totem-pole PFC 1 is called a first current sampling module 10, and the current sampling module sampled the second fast switch Q2 of the bridgeless totem-pole PFC 1 is called a second current sampling module 20.

In a positive half cycle of the AC power that a voltage of the connection point of the first fast switch Q1 and the second fast switch Q2 is higher than a voltage of the connection point of the first slow switch Q3 and the second slow switch Q4, an energy storage current of the magnetizing inductance Lm in an energy storage period flows through the second fast switch Q2 and the second slow switch Q4 to form an energy storage circuit, and the second current sampling module 20 samples the energy storage current. In a negative half cycle of the AC power that a voltage of the connection point of the first fast switch Q1 and the second fast switch Q2 is lower than a voltage of the connection point of the first slow switch Q3 and the second slow switch Q4, the energy storage current of the magnetizing inductance Lm in the energy storage period flows through the first slow switch Q3 and the first slow switch Q1 to form the energy storage circuit, and the first current sampling module 10 samples the energy storage current.

In the following description, current paths of the energy storage period and an energy release period of the magnetizing inductance Lm when the AC power operating in the positive and negative half cycles will be further clearly explained.

The first current sampling module 10 and the second current sampling module 20 of the two current sampling circuits have same components and are symmetrically arranged on both sides of the sampling resistor RL.

Referring to FIG. 1, in a first preferred embodiment of the present invention, the first current sampling module 10 includes a first transformer T1, a first sampled current phase switching unit 11, a first main current freewheeling unit 12 and a first demagnetizing unit 13. The first transformer T1 includes a first primary winding N11 and a first secondary winding N12 coupled with the first primary winding N11. The magnetizing inductance generated on the first transformer T1 is represented by the first magnetizing inductance CT1_Lm. The first primary winding N11 is serially connected to the first fast switch Q1. The first secondary winding N12 has two ends, the two ends including a first end and a second end. The first demagnetizing unit 13 and the first main current freewheeling unit 12 are connected to the first secondary winding N12 in parallel. The first end and the second end of the first secondary winding N12 are connected to the sampling resistor RL through the first sampled current phase switching unit 11.

Referring to FIG. 1, the second current sampling module 20 is similar to the first current sampling module 10. The second current sampling module 20 includes a second transformer T2, a second sampled current phase switching unit 21, a second main current freewheeling unit 22 and a second demagnetizing unit 23. The second transformer T2 includes a second primary winding N21 and a second secondary winding N22 coupled with the second primary winding N22. A magnetizing inductance generated on the second transformer T2 is represented by the second magnetizing inductance CT2_Lm. The second primary winding N21 is serially connected to the second fast switch Q2. The second secondary winding N22 has two ends, the two ends including a first end and a second end. The second demagnetizing unit 13 and the second main current freewheeling unit 22 are connected to the second secondary winding N22 in parallel. The first end and the second end of the second secondary winding N22 are connected to the sampling resistor RL through the second sampled current phase switching unit 21.

In the above-mentioned first current sampling module 10 and second current sampling module 20, the first sampled current phase switching unit 11 and the second sampled current phase switching unit 21 are used to form a first sampling circuit and a second sampling circuit that allow a sampling current to map to the first secondary winding N12 or the second secondary winding N22 to flow through the sampling resistor RL when the first transformer T1 or the second transformer T2 is in the energy storage period. When the first transformer T1 or the second transformer T2 is in the energy storage period, the energy storage current of the magnetizing inductance Lm flows through the first fast switch Q1 or the second fast switch Q2 and flows through the first primary winding N11 or the second primary winding N21.

In the above-mentioned first current sampling module 10 and second current sampling module 20, the first sampled current phase switching unit 11 or the second sampled current phase switching unit 21 are used to form a path that allows an energy release current of the first fast switch Q1 or the second fast switch Q2 to map to a mapping current of the first transformer T1 or the second transformer T2 during the energy release period of the magnetizing inductance Lm.

The first demagnetizing unit 13 and the second demagnetizing unit 23 are used to provide a freewheeling path for a storage energy of the magnetizing inductance Lm of the secondary windings when the first transformer T1 or the second transformer T2 completes the energy storage period and enters the energy release period because there is no current flowing through the primary windings.

Referring to FIG. 1, in a preferred embodiment of the present invention, the first current sampling module 10 further includes a first resonant current freewheeling unit 14, and the second current sampling module 20 further includes a second resonant current freewheeling unit 24. The first resonant current freewheeling unit 14 and the second resonant current freewheeling unit 24 are used to provide a path on a side of the secondary windings for a resonant current mapped to the secondary windings to release energy. The first resonant current freewheeling unit 14 and the second resonant current freewheeling unit 24 provide the path when the bridgeless PFC operates in the energy storage period of a light-load Discontinuous Conduction Mode (DCM) and the first fast switch Q1 or the second fast switch Q2 is turned off to generate the resonant current.

Figure 3:
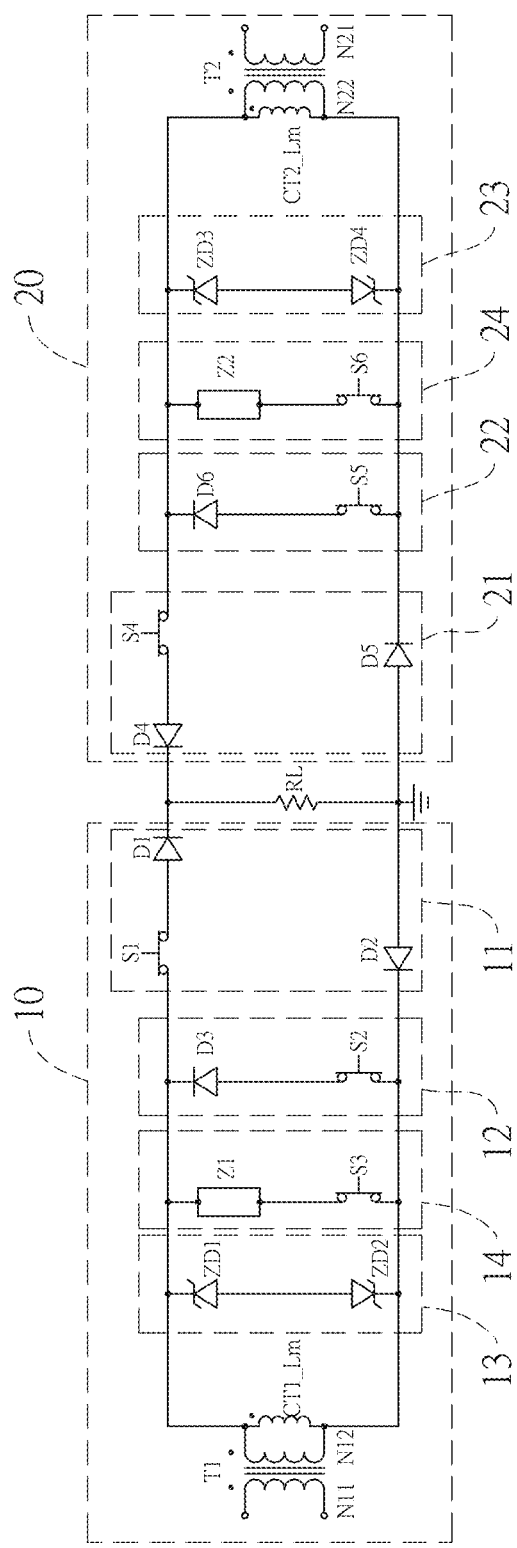
FIG. 3 is a circuit diagram of the current sampling circuit for the bridgeless power factor corrector.

With reference to FIG. 3, the first current sampling module 10 and second current sampling module 20 will be further clearly explained in the following description.

The first sampled current phase switching unit 11 mainly includes diodes and switches which are connected in series. The above-mentioned diodes can include, for example, a general diode, a Zener diode, a fast diode, etc. The above-mentioned switches can include, for example, a Metal-Oxide-Semiconductor Field-Effect Transistor (MOSFET), a Bipolar Junction Transistor (BJT), an Insulated Gate Bipolar Transistor (IGBT), etc.

In a preferred embodiment of the present invention, the first sampled current phase switching unit 11 includes a first diode D1, a second diode D2 and a first switch S1. The first diode D1, the second diode D2, the first switch S1 and the sampling resistor RL form a first sampling circuit of the first transformer T1.

More specifically, in the first sampled current phase switching unit 11, the first diode D1 is connected between the first end of the first secondary winding N12 and one end of the sampling resistor RL, and the second diode D2 is connected between the second end of the first secondary winding N12 and another end of the sampling resistor RL. A connection direction of the first diode D1 and the second diode D2 is based on a current direction of the sampling current of the secondary windings when the energy storage current flows through the first primary winding N11 of the first transformer T1 and a voltage of the first secondary winding N12 is positive.

With reference to FIG. 3, the first main current freewheeling unit 12 mainly includes diodes and switches. The above-mentioned diodes can include, for example, a general diode, a Zener diode, a fast diode, etc. The above-mentioned switches can include, for example, a MOSFET, a BJT, an IGBT, etc.

In a preferred embodiment of the present invention, the first main current freewheeling unit 12 includes a third diode D3 and a second switch S2. The third diode D3 and the second switch S2 are connected in series, and the third diode D3 and the second switch S2 are connected to the first secondary winding N12 in parallel. A connection direction of the third diode D3 is based on a current direction of a freewheeling demagnetization current generated by the magnetizing inductance Lm flowing through the first primary winding N11 during the energy release period and mapping to the first secondary winding N12.

With reference to FIG. 3, the first demagnetizing unit 13 mainly includes impedance elements, for example, resistors and Zener diodes. In a preferred embodiment of the present invention, the first demagnetizing unit 13 includes a first Zener diode ZD1 and a second Zener diode ZD2. The first Zener diode ZD1 and the second Zener diode ZD2 are serially connected to each other in opposite directions, and are connected to the first secondary winding N12 in parallel.

With reference to FIG. 3, the first resonant current freewheeling unit 14 mainly includes switches and impedance elements. The above-mentioned impedance elements can include, for example, a resistor. The above-mentioned switches can include, for example, a MOSFET, a BJT, an IGBT, etc.

In a preferred embodiment of the present invention, the first resonant current freewheeling unit 14 includes a first impedance Z1 and a third switch S3. The first impedance Z1 and the third switch S3 are connected in series and connected to the first secondary winding N12 in parallel.

The composition of the second current sampling module 20 is similar to the composition of the first current sampling module 10. The composition of the second current sampling module 20 will be described below.

The second sampled current phase switching unit 21 mainly includes diodes and switches which are connected in series. The above-mentioned diodes can include, for example, a general diode, a Zener diode, a fast diode, etc. The above-mentioned switches can include, for example, a MOSFET, a BJT, an IGBT, etc.

In a preferred embodiment of the present invention, the second sampled current phase switching unit 21 includes a fourth diode D4, a fifth diode D5 and a fourth switch S4. The fourth diode D4, the fifth diode D5, the fourth switch S4 and the sampling resistor RL form a second sampling circuit of the second transformer T2.

More specifically, in the second sampled current phase switching unit 21, the fourth diode D4 is connected between the first end of the second secondary winding N22 and one end of the sampling resistor RL, and the fifth diode D5 is connected between the second end of the second secondary winding N22 and another end of the sampling resistor RL. A connection direction of the fourth diode D4 and the fifth diode D5 is based on a current direction of the sampling current of the secondary windings when the energy storage current flows through the second primary winding N21 of the second transformer T2 and a voltage of the second secondary winding N22 is positive.

With reference to FIG. 3, the second main current freewheeling unit 22 mainly includes diodes and switches. The above-mentioned diodes can include, for example, a general diode, a Zener diode, a fast diode, etc. The above-mentioned switches can include, for example, a MOSFET, a BJT, an IGBT, etc.

In a preferred embodiment of the present invention, the second main current freewheeling unit 22 includes a sixth diode D6 and a fifth switch S5. The sixth diode D6 and the fifth switch S5 are connected in series, and the sixth diode D6 and the fifth switch S5 are connected to the second secondary winding N22 in parallel. A connection direction of the sixth diode D6 is based on a current direction of a freewheeling demagnetization current generated by the magnetizing inductance Lm flowing through the second primary winding N21 during the energy release period and mapping to the second secondary winding N22.

With reference to FIG. 3, the second demagnetizing unit 23 mainly includes impedance elements, for example, resistors and Zener diodes. In a preferred embodiment of the present invention, the second demagnetizing unit 23 includes a third Zener diode ZD3 and a fourth Zener diode ZD4. The third Zener diode ZD3 and the fourth Zener diode ZD4 are serially connected to each other in opposite directions, and are connected to the second secondary winding N22 in parallel.

With reference to FIG. 3, the second resonant current freewheeling unit 24 mainly includes switches and impedance elements. The above-mentioned impedance elements can include, for example, a resistor. The above-mentioned switches can include, for example, a MOSFET, a BJT, an IGBT, etc.

In a preferred embodiment of the present invention, the second resonant current freewheeling unit 24 includes a second impedance Z2 and a sixth switch S6. The second impedance Z2 and the sixth switch S6 are connected in series and connected to the second secondary winding N22 in parallel.

Circuit operations of the current sampling circuit for the bridgeless PFC are explained below by different current paths of the AC power in the positive half cycle and the negative half cycle. It should be noted that the following operation procedures of the first switch S1 and the second switch S2 of the first current sampling module 10 and the fourth switch S4 and the fifth switch S5 of the second current sampling module 20 are applicable to the bridgeless totem-pole PFC 1 operating in a Continuous Conduction Mode (CCM) or a DCM.

In the positive half cycle of the AC power, the second switch S2 of the first current sampling module 10 and the fourth switch S4 of the second current sampling module 20 are turned on, and the first switch S1 of the first current sampling module 10 and the fifth switch S5 of the second current sampling module 20 are turned off.

Figure 4A:
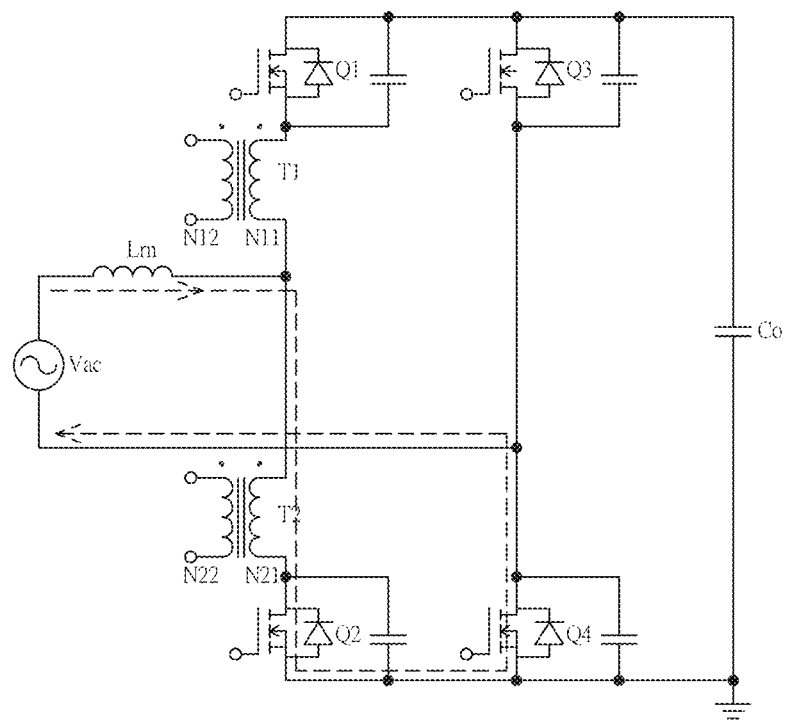
FIG. 4A is a current path diagram of an energy storage period of the bridgeless power factor corrector in the positive half cycle of the AC power.
Figure 4B:
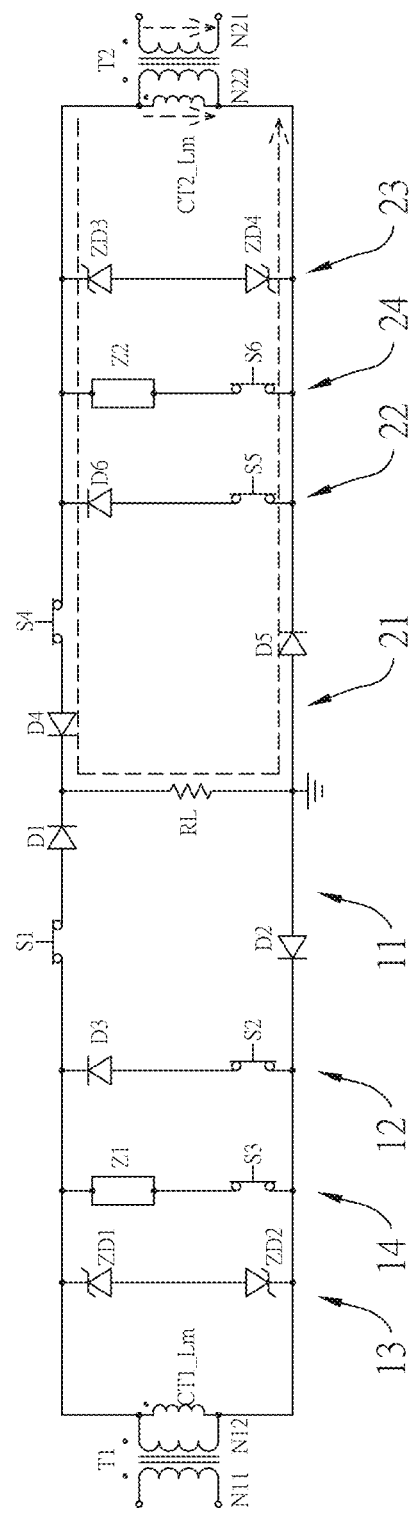
FIG. 4B is a current path diagram of an energy storage period of the current sampling circuit for the bridgeless power factor corrector in the positive half cycle of the AC power.

With reference to FIGS. 4A and 4B, during the energy storage period of the magnetizing inductance Lm, the second fast switch Q2 and the second slow switch Q4 of the bridgeless totem-pole PFC 1 are turned on. The energy storage current of the magnetizing inductance Lm flows through the second primary winding N21, the second fast switch Q2 and the second slow switch Q4. No current flows through the first primary winding N11. The energy storage current flowing through the primary windings of the second transformer T2 maps to the secondary windings to generate the sampling current. A main sampling current flows through the fourth switch S4, the forth diode D4, a sampling resistor RL, and the fifth diode D5 to form the second sampling circuit.

Figure 5A:
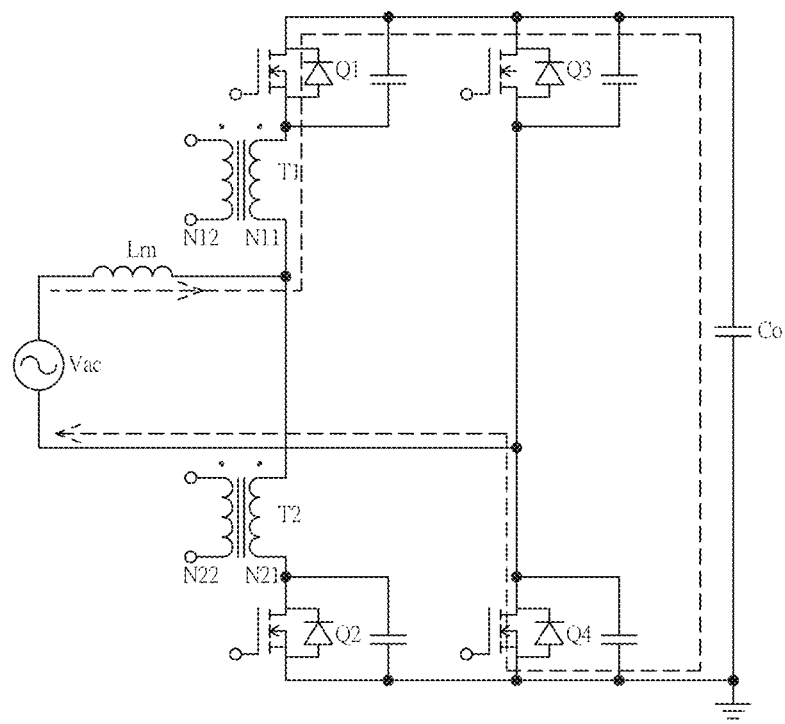
FIG. 5A is a current path diagram of an energy release period of the bridgeless power factor corrector in the positive half cycle of the AC power.
Figure 5B:
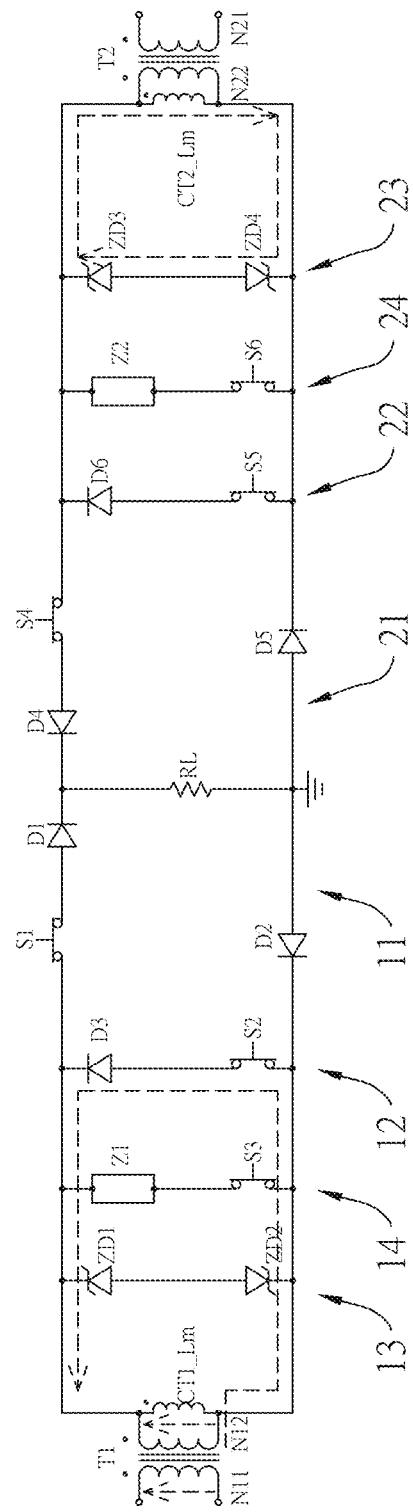
FIG. 5B is a current path diagram of an energy release period of the current sampling circuit for the bridgeless power factor corrector in the positive half cycle of the AC power.

With reference to FIGS. 5A and 5B, when the AC power operates in the positive half cycle and the magnetizing inductance Lm is in the energy release (demagnetizing) period, the first fast switch Q1 and the second slow switch Q4 of the bridgeless totem-pole PFC 1 are turned on. The energy release current of the magnetizing inductance Lm flows through the first primary winding N11, the first fast switch Q1, the output capacitor Co and the second slow switch Q4. The energy release current flows through the first primary winding N11 from the bottom to the top. No current flows through the second primary winding N21. The energy release current flowing through the first primary winding N11 maps to the first secondary winding N12, and the mapped energy release current flows through the second switch S2 and the third diode D3, making the first end and the second end of the first secondary winding N12 form a short circuit. Since no current flows through the second primary winding N21, a current stored in the second magnetizing inductance CT2_Lm of the second transformer T2 causes the fourth Zener diode ZD4 to collapse, and the second demagnetizing unit 23 is turned on, making the second transformer T2 demagnetized by the second demagnetizing unit 23.

In the negative half cycle of the AC power, the first switch S1 of the first current sampling module 10 and the fifth switch S5 of the second current sampling module 20 are turned on, and the second switch S2 of the first current sampling module 10 and the fourth switch S4 of the second current sampling module 20 are turned off.

Figure 6A:
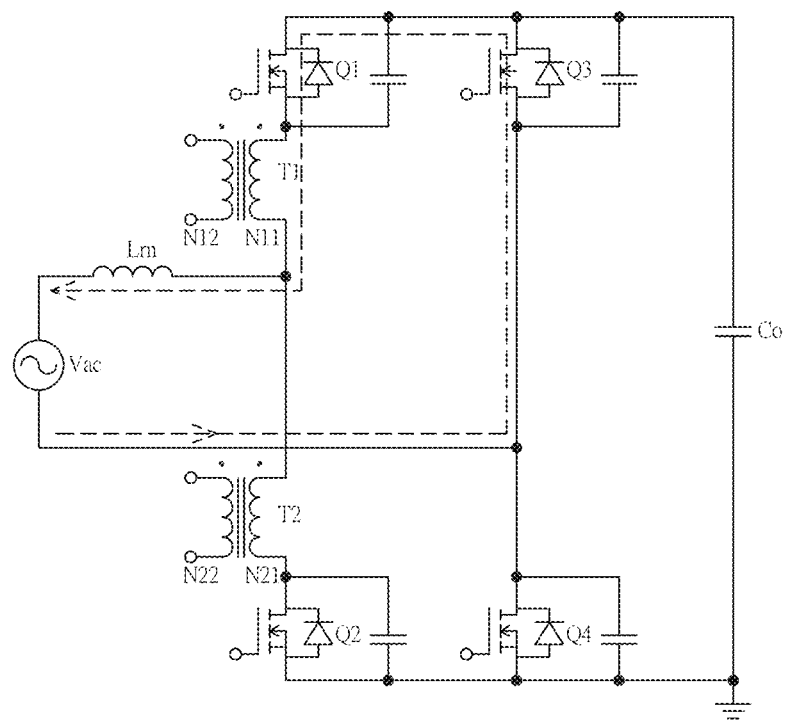
FIG. 6A is a current path diagram of an energy storage period of the bridgeless power factor corrector in the negative half cycle of the AC power.
Figure 6B:
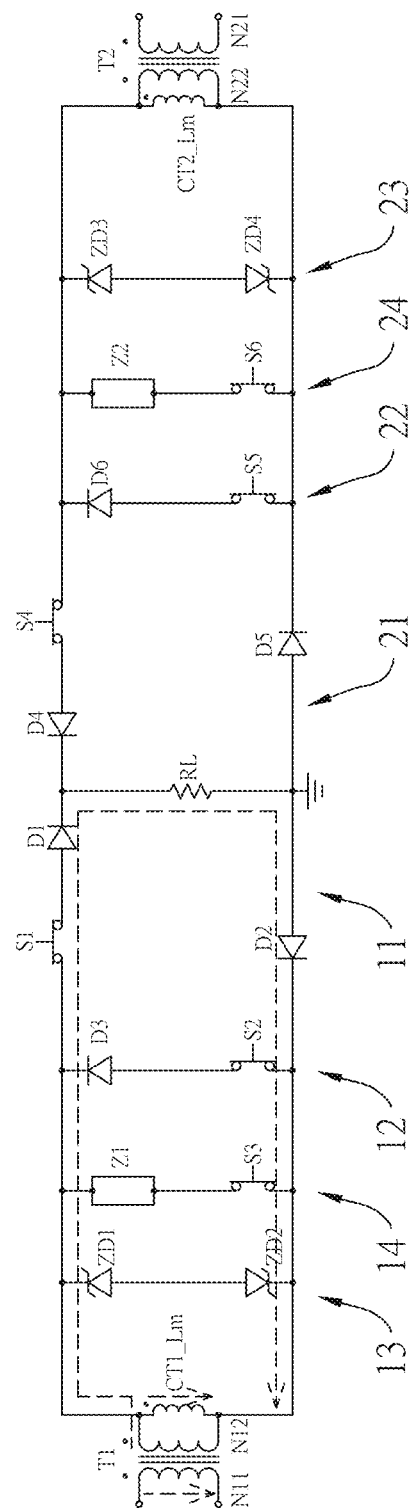
FIG. 6B is a current path diagram of an energy storage period of the current sampling circuit for the bridgeless power factor corrector in the negative half cycle of the AC power.

With reference to FIGS. 6A and 6B, when the AC power operates in the negative half cycle and the magnetizing inductance Lm is in the energy storage period, the first fast switch Q1 and the first slow switch Q3 of the bridgeless totem-pole PFC 1 are turned on. The energy storage current of the magnetizing inductance Lm flows through the first primary winding N11, the first fast switch Q1 and the first slow switch Q3. No current flows through the second primary winding N21. The energy storage current flowing through the first primary winding N11 maps to the secondary windings to generate the sampling current. The sampling current flows through the first switch S1, the first diode D1, a sampling resistor RL, and the second diode D2 to form the first sampling circuit.

Figure 7A:
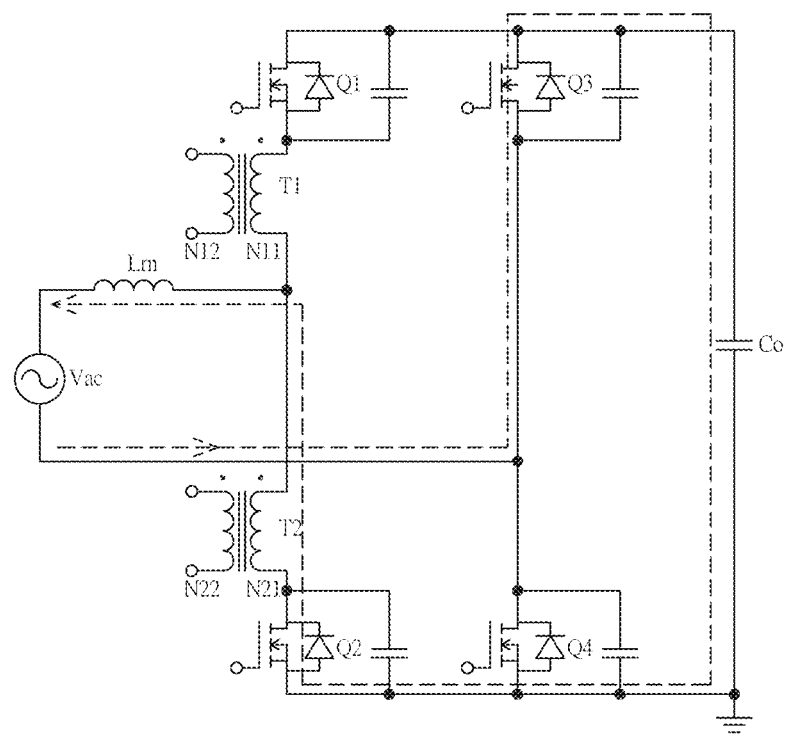
FIG. 7A is a current path diagram of an energy release period of the bridgeless power factor corrector in the negative half cycle of the AC power.
Figure 7B:
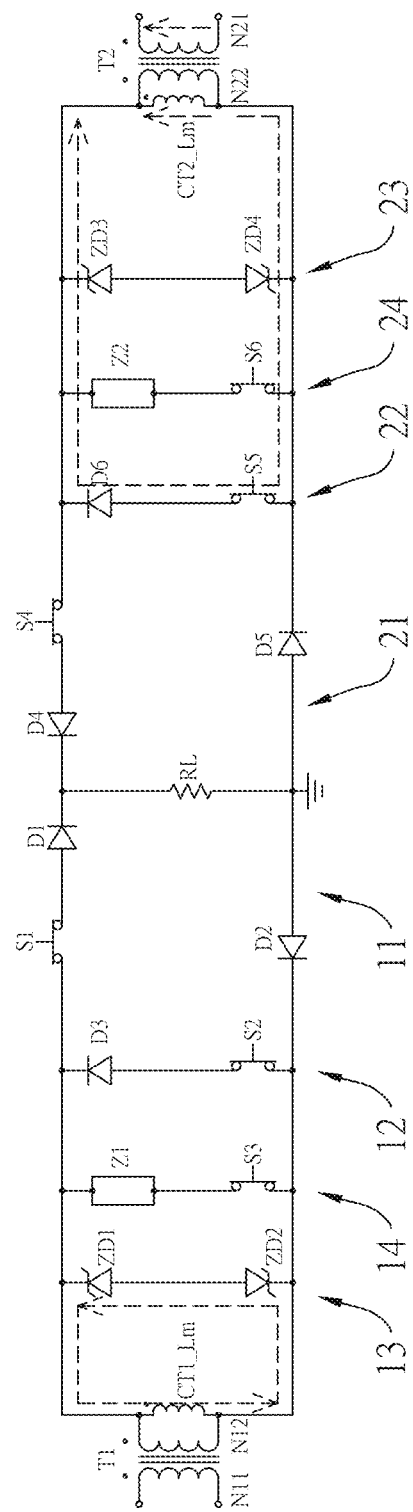
FIG. 7B is a current path diagram of an energy release period of the current sampling circuit for the bridgeless power factor corrector in the negative half cycle of the AC power.

With reference to FIGS. 7A and 7B, when the AC power operates in the negative half cycle and the magnetizing inductance Lm is in the energy storage period, the second fast switch Q2 and the first slow switch Q3 of the bridgeless totem-pole PFC 1 are turned on. The energy release current of the magnetizing inductance Lm flows through the second primary winding N21, the first slow switch Q3, the output capacitor Co and the second fast switch Q2. The energy release current flows through the second primary winding N21 from the bottom to the top. No current flows through the first primary winding N11. The energy release current flowing through the second primary winding N21 maps to the second secondary winding N22, and the mapped energy release current flows through the fifth switch S5 and the sixth diode D6, making the first end and the second end of the second secondary winding N22 form a short circuit. Since no current flows through the first primary winding N11, a current stored in the magnetizing inductance Lm of the first transformer T1 causes the second Zener diode ZD2 to collapse, and the first demagnetizing unit 13 is turned on, making the first transformer T1 demagnetized by the first demagnetizing unit 13.

The current sampling circuit of the present invention uses the first sampled current phase switching unit 11 and the second sampled current phase switching unit 21 to respectively provide the sampling circuits for the energy storage current flowing through the first fast switch Q1 and the second fast switch Q2 of a bridgeless totem-pole in the positive half cycle and the negative half cycle of the AC power.

The conduction states of the first switch S1 to the sixth switch S6 of the first current sampling module 10 and the second current sampling module 20 are the same in every positive half cycle and every negative half cycle. In the positive half cycle, the second switch S2 and the fourth switch S4 are turned on, and the first switch S1, the fifth switch S5, and the sixth switch S6 are turned off. In the negative half cycle, the first switch S1 and the fifth switch S5 are turned on, and the second switch S2 and the fourth switch S4 are turned off.

In addition, when the bridgeless totem-pole PFC 1 operates in the CCM, the third switch S3 of the first resonant current freewheeling unit 14 and the sixth switch S6 of the second resonant current freewheeling unit 24 are turned off and inoperative during both the positive half cycle and the negative half cycle.

To illustrate the working principles of the first resonant current freewheeling unit 14 and the second resonant current freewheeling unit 24, the following will first describe a phenomenon about the sampling current offset caused by the resonant current when the bridgeless totem-pole PFC 1 operates in the DCM without the first resonant current freewheeling unit 14 and the second resonant current freewheeling unit 24 or the first resonant current freewheeling unit 14 and the second resonant current freewheeling unit 24 are not working. Next, operations and working effects of the first resonant current freewheeling unit 14 and the second resonant current freewheeling unit 24 will be described below.

Figure 8:
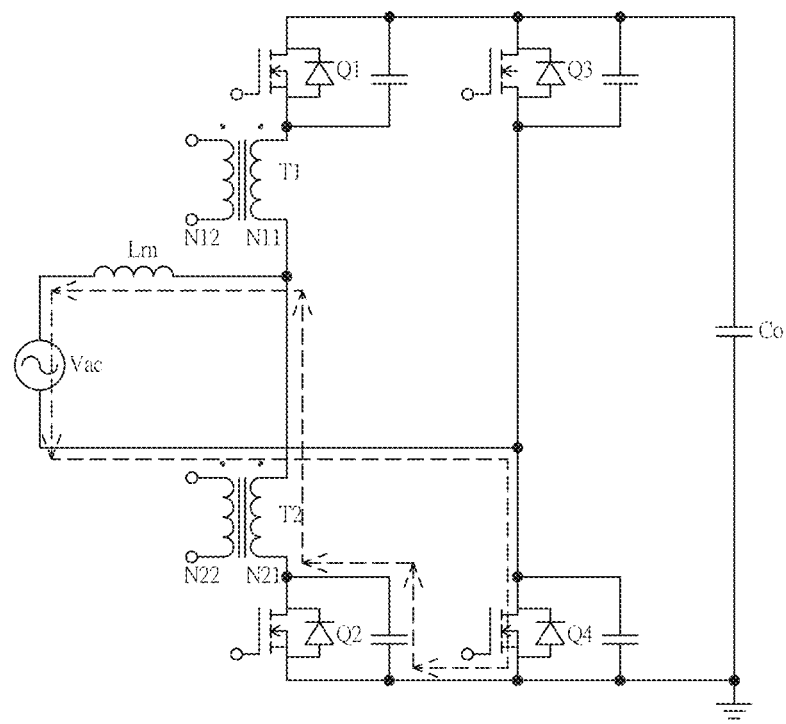
FIG. 8 is a resonant current path diagram of the bridgeless power factor corrector during a discontinuous conduction mode.

With reference to FIG. 8, take the AC power operating in the positive half cycle as an example. If the first resonant current freewheeling unit 14 and the second resonant current freewheeling unit 24 are not working, that is, the third switch S3 and the sixth switch S6 keep turning off, when the bridgeless totem-pole PFC 1 operates in the DCM, resonance occurs on the second fast switch Q2, making a reverse resonant current flowing through the second primary winding N21 of the second transformer T2 during the energy storage period.

Figure 9:
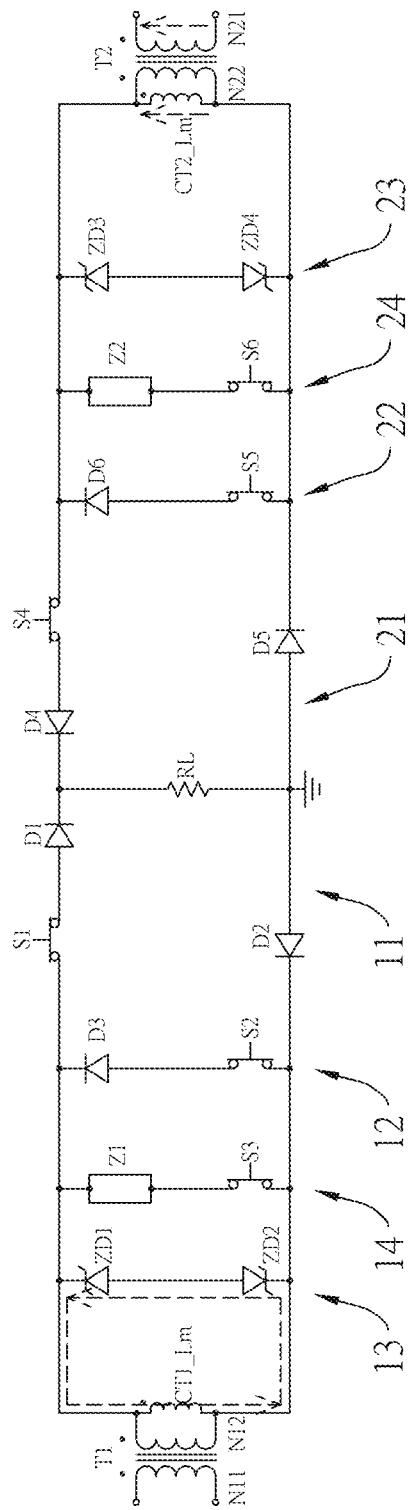
FIG. 9 is a current storage path diagram of the resonant current of the current sampling circuit.

With reference to FIG. 9, when the reverse resonant current flows through the second primary winding N21 and maps to the second secondary winding N22, because a voltage generated by the second secondary winding N22 is not enough to make the fourth Zener diode ZD4 collapse, the mapped resonant current will be stored by the second magnetizing inductance CT2_Lm.

Figure 10:
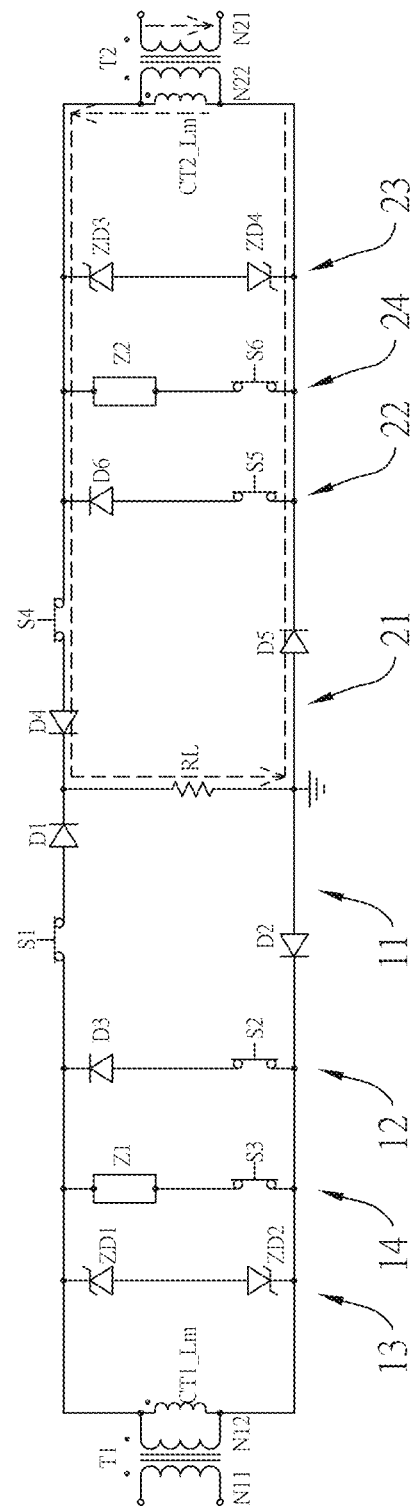
FIG. 10 is a current path diagram of the combined resonant current and sampling current.

With reference to FIG. 10, when the reverse resonant current is lower than the energy storage current, the energy storage current begins to flow forward into the second primary winding N21. The sampling current mapped to the second secondary winding N22 is combined with the mapped resonant current to form the second sampling circuit including the mapped resonant current by flowing through the fourth switch S4, the fourth diode D4, the sampling resistor RL and the fifth diode D5, making the sampling current offset. In the negative half cycle of the AC power, the resonant current occurs on the first transformer T1, which is similar to the resonant current of the second transformer T2 within the positive half cycle.

In a preferred embodiment of the present invention, when the bridgeless totem-pole PFC 1 operates in the DCM and the AC power operates in the positive half cycle, the third switch S3 of the first resonant current freewheeling unit 14 is turned off, and the sixth switch S6 of the second resonant current freewheeling unit 24 is turned on. On the contrary, In the negative half cycle of the AC power, the third switch S3 of the first resonant current freewheeling unit 14 is turned on, and the sixth switch S6 of the second resonant current freewheeling unit 24 is turned off.

Figure 11:
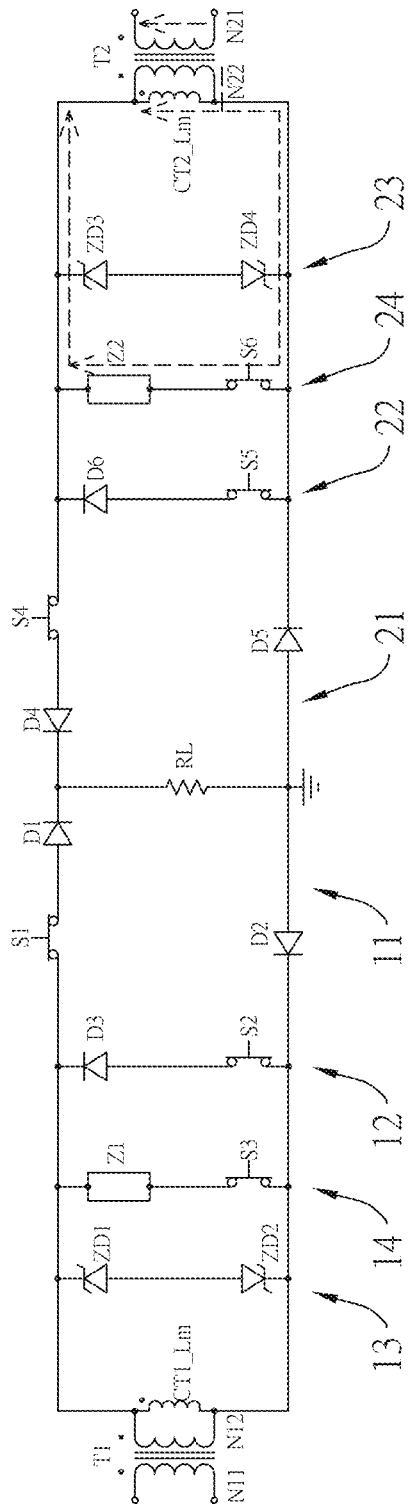
FIG. 11 is an energy release current path diagram of the resonant current of the current sampling circuit for the bridgeless power factor corrector.
Figure 12:
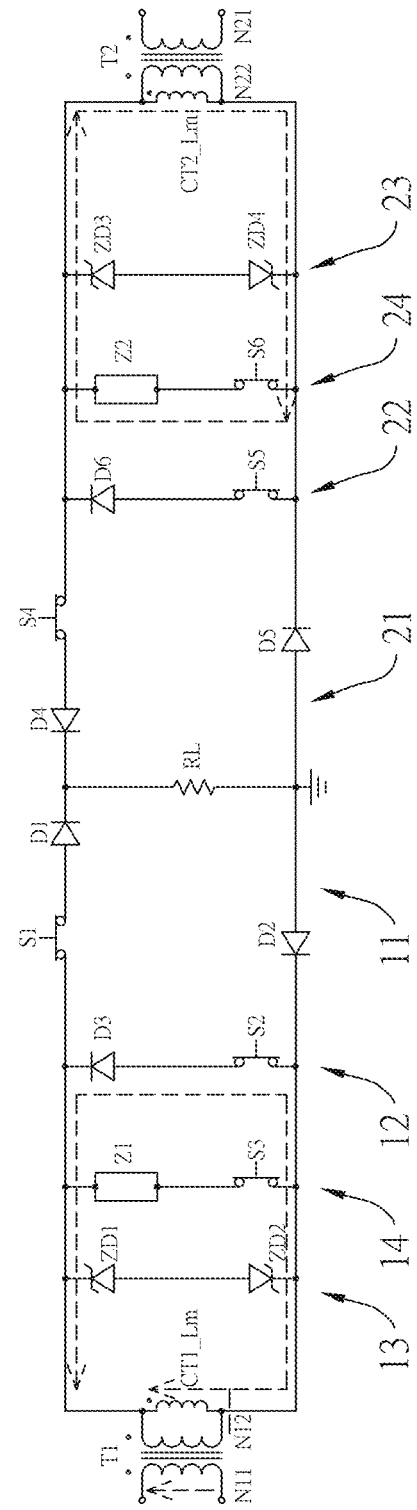
FIG. 12 is another energy release current path diagram of the resonant current of the current sampling circuit for the bridgeless power factor corrector.

With reference to FIG. 11, when the AC power operates in the positive half cycle and the magnetizing inductance Lm is in the energy storage period, the resonant current occurs and maps to the second secondary winding N22. The current releases energy through the second impedance Z2 and the sixth switch S6. With reference to FIG. 12, when magnetizing inductance Lm is in the energy release period, the first transformer T1 performs short-circuit freewheeling through the first secondary winding N12, the second switch S2 of the first current sampling module 10 and the third diode D3 of the first current sampling module 10. The energy storage current and the resonant current stored by the second magnetizing inductance CT2_Lm are released through the second impedance Z2 and the sixth switch S6 to demagnetize the second transformer T2.

Figure 13:
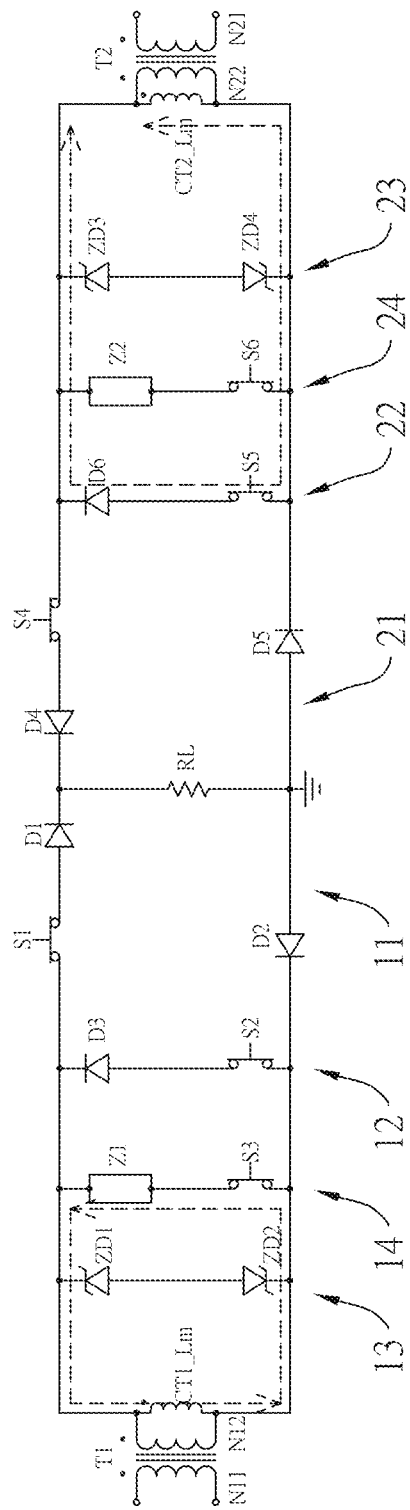
FIG. 13 is another energy release current path diagram of the resonant current of the current sampling circuit for the bridgeless power factor corrector.

In the negative half cycle of the AC power, the resonant current flows through the first transformer T1, which is similar to the resonance principle of the second transformer T2 within the positive half cycle. The resonant current maps to the first secondary winding N12, and the current releases energy through the first impedance Z1 and the third switch S3. With reference to FIG. 13, when magnetizing inductance Lm is in the energy release period, the second transformer T2 performs short-circuit freewheeling through the second secondary winding N22, the fifth switch S5 of the first current sampling module 10 and the sixth diode D6 of the first current sampling module 10. The energy storage current and the resonant current stored by the second magnetizing inductance CT2_Lm are released through the first impedance Z1 and the third switch S3 to demagnetize the first transformer T1.

Figure 14A:
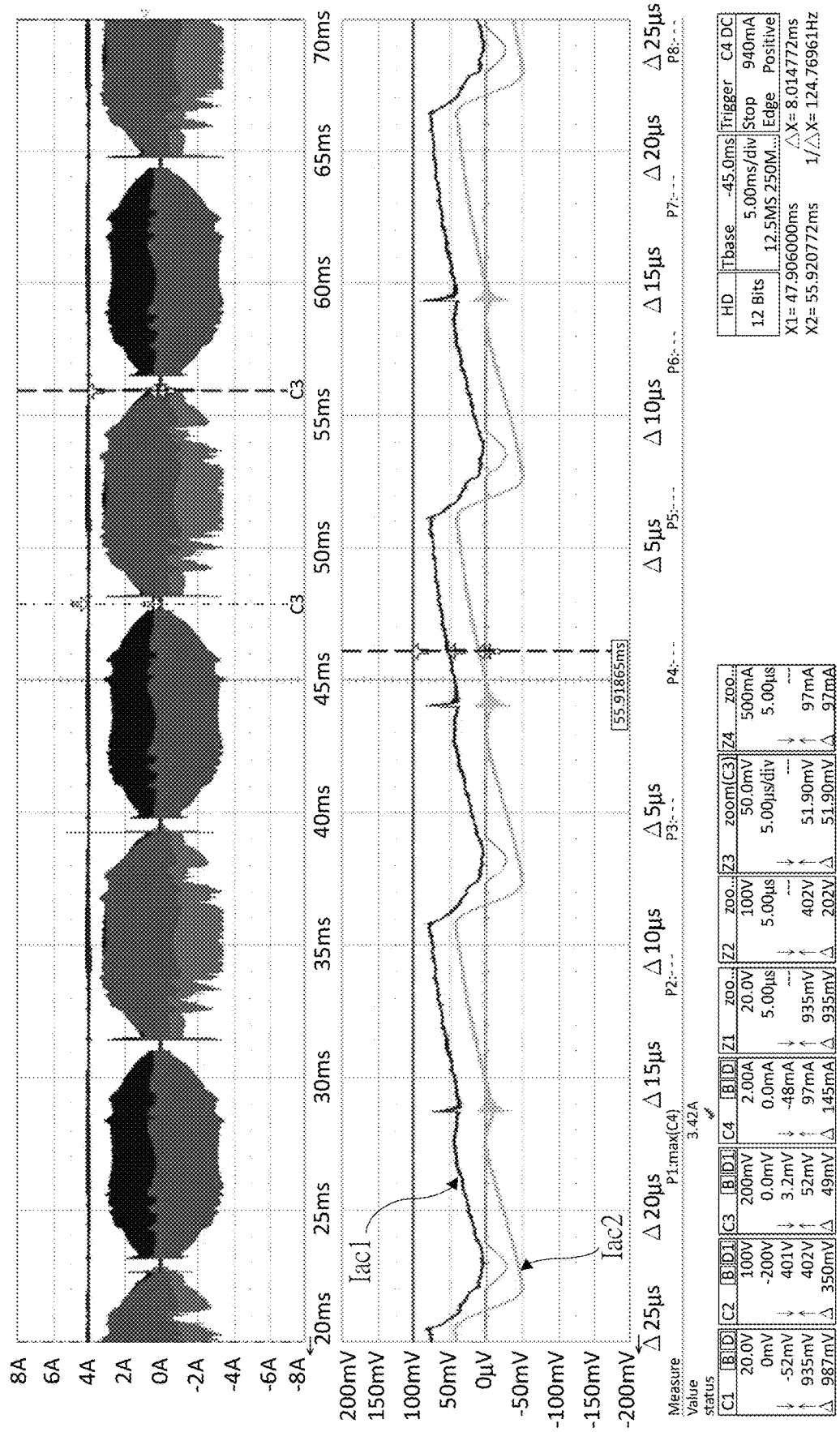
FIG. 14A is a waveform diagram of the combined resonant current and sampling current of the current sampling circuit.
Figure 14B:
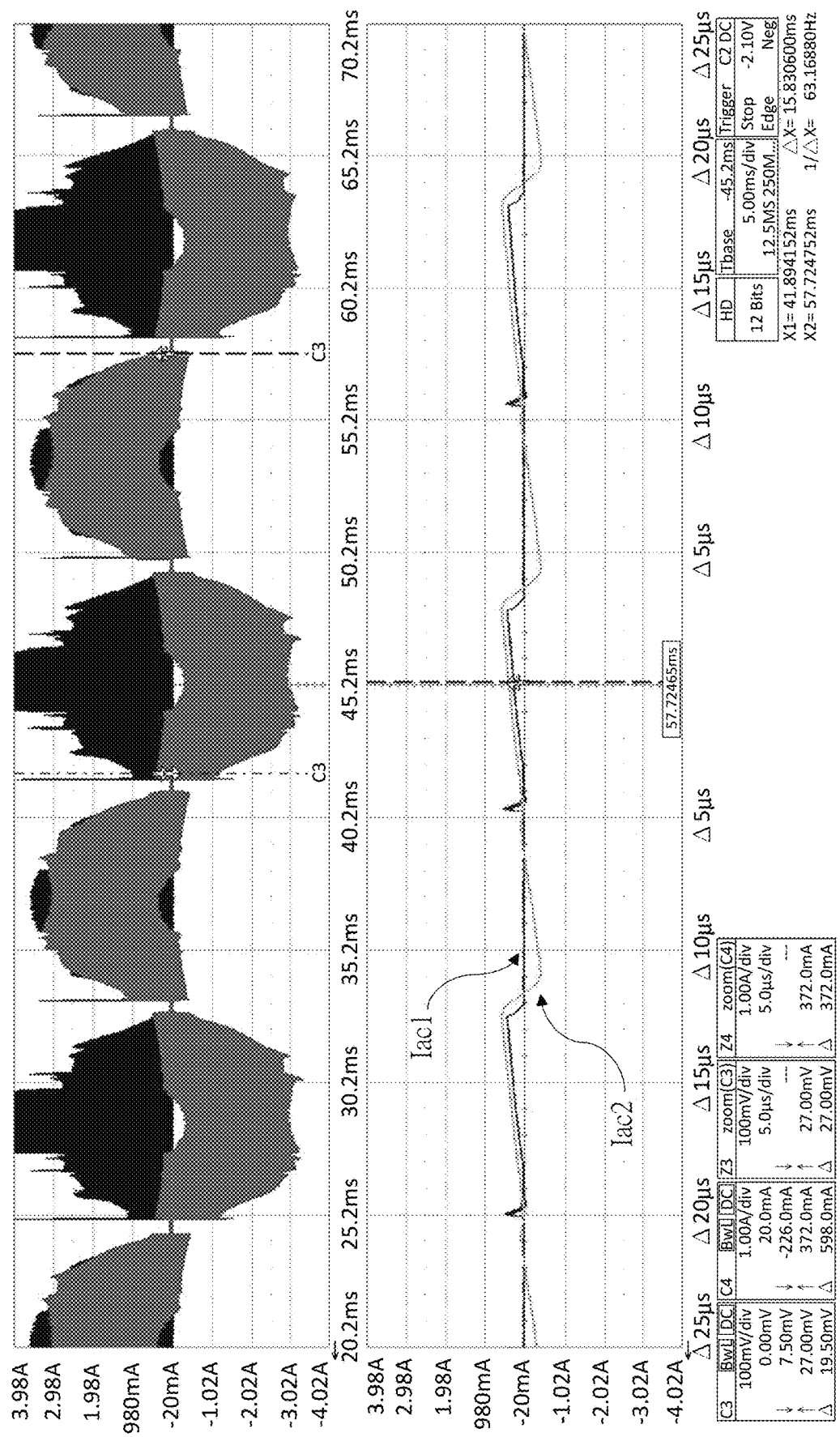
FIG. 14B is a waveform diagram of the combined resonant current and sampling current of the current sampling circuit for the bridgeless power factor corrector.

With reference to FIGS. 14A and 14B, FIG. 14A is a sampling current waveform when the bridgeless totem-pole PFC 1 operates in the DCM without the first resonant current freewheeling unit 14 and the second resonant current freewheeling unit 24 or the first resonant current freewheeling unit 14 and the second resonant current freewheeling unit 24 are not working. FIG. 14B is a sampling current waveform when the bridgeless totem-pole PFC 1 operates in the DCM and the first resonant current freewheeling unit 14 and the second resonant current freewheeling unit are working.

In FIG. 14A, the sampling current Iac1 obtained through the sampling resistor RL is combined with the resonant current causing a waveform of the sampling current Iac1 to obviously deviate from a waveform of an actual current Iac2. In FIG. 14B, the first resonant current freewheeling unit 14 and the second resonant current freewheeling unit 24 release the resonant current mapped to the first secondary winding N12 and the second secondary winding N22, so that the waveform of the sampling current Iac1 is more consistent with the waveform of an actual current Iac2.

Figure 15A:
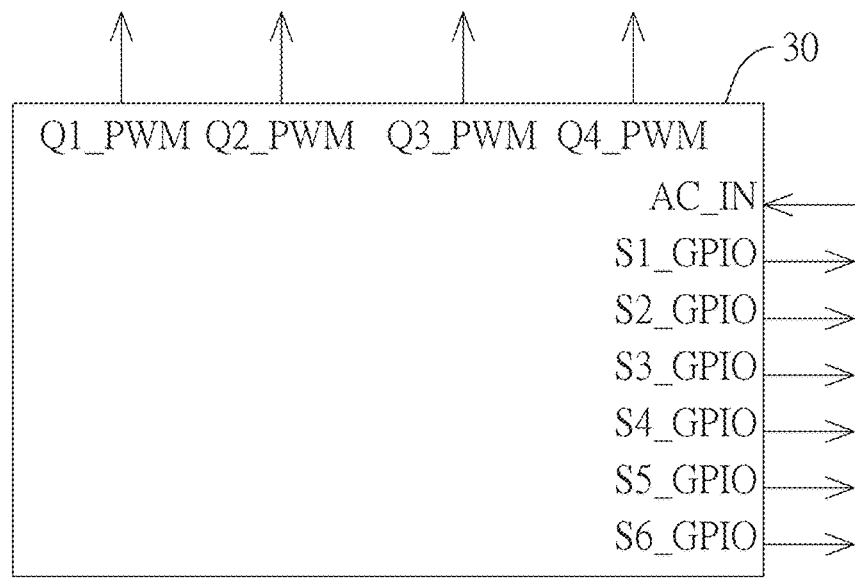
FIG. 15A is a controller diagram of the current sampling circuit for the bridgeless power factor corrector.

With reference to FIG. 15, the current sampling circuit of the present invention further includes a controller 30. The controller 30 is electrically connected to the first sampled current phase switching unit 11, the first main current freewheeling unit 12, the first resonant current freewheeling unit 14, the second sampled current phase switching unit 21, the second main current freewheeling unit 22 and the second resonant current freewheeling unit 24. The controller 30 includes an AC input IN_ADC, a first fast switch control output Q1_PWM, a second fast switch control output Q2_PWM, a first slow switch control output Q3_GPIO and a second slow switch control output Q4_GPIO. The controller 30 is further electrically connected to a first switch control output S1_GPIO to a sixth switch control output S6_GPIO of the first switch S1 to the sixth switch S6.

Figure 15B:
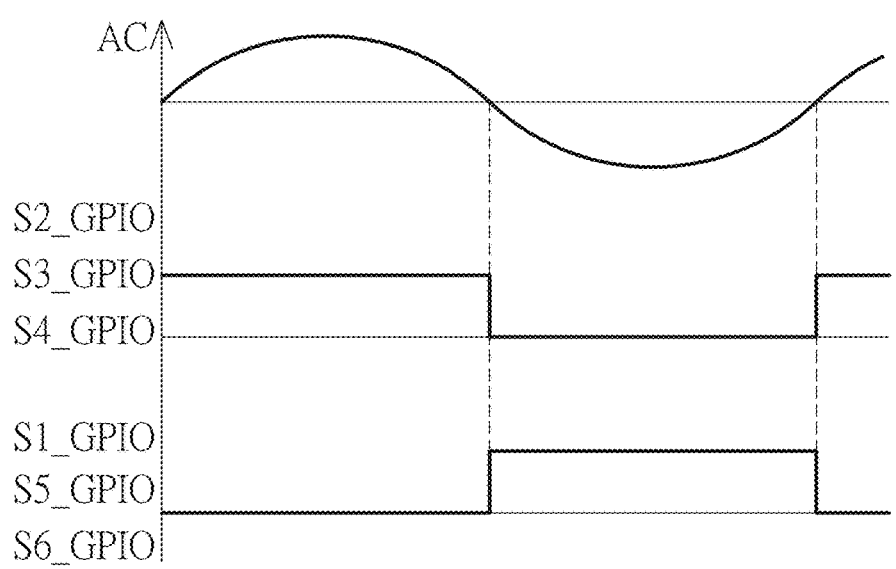
FIG. 15B is a switch control signal waveform diagram of the controller of the present invention relative to the AC power waveform.

With reference to FIG. 15B, the controller 30 turns on the second switch S2 and the fourth switch S4 and turns off the first switch S1 and the fifth switch S5 in the positive half cycle of the AC power, so that the second sampled current phase switching unit 21 forms the second sampling circuit. The first main current freewheeling unit 12 is turned on. The first sampled current phase switching unit 11 and the second main current freewheeling unit 22 are turned off.

The controller 30 turns on the first switch S1 and the fifth switch S5 and turns off the second switch S2 and the fourth switch S4 in the negative half cycle of the AC power, so that the first sampled current phase switching unit 11 forms the first sampling circuit. The second main current freewheeling unit 22 is turned on. The second sampled current phase switching unit 21 and the first main current freewheeling unit 12 are turned off.

Furthermore, the controller 30 is also electrically connected to the third switch S3 of the first resonant current freewheeling unit 14 and the sixth switch S6 of the second resonant current freewheeling unit 24. When the bridgeless totem-pole PFC 1 operates in the DCM and the AC power operates in the positive half cycle, the controller 30 turns on the sixth switch S6, making the second resonant current freewheeling unit 24 turned on, and turns off the third switch S3, making the first resonant current freewheeling unit 14 turned off. When the bridgeless totem-pole PFC 1 operates in the DCM and the AC power operates in the negative half cycle, the controller 30 turns on the third switch S3, making the first resonant current freewheeling unit 14 turned on, and turns off the sixth switch S6, making the second resonant current freewheeling unit 24 turned off.

The first fast switch control output Q1_PWM and second fast switch control output Q2_PWM are PWM control output terminals that require high output frequency. The first switch control output S1_GPIO to the sixth switch control output S6_GPIO can use a general-purpose input/output (GPIO) with the same output frequency as the first slow switch control output Q3_GPIO and the second slow switch control output Q4_GPIO use.

According to the foregoing description of the first switch control output S1_GPIO to the sixth switch control output S6_GPIO, the first switch S1 to the sixth switch S6 switch every half cycle, so a switching frequency of the first switch S1 to the sixth switch S6 is twice the switching frequency of the AC power. The switching frequency of the common AC power is about 60 Hz, so the switching frequency of the first switch control output S1_GPIO to the sixth switch control output S6_GPIO is about 120 Hz. A GPIO output frequency of existing controllers is enough.

Figure 16:
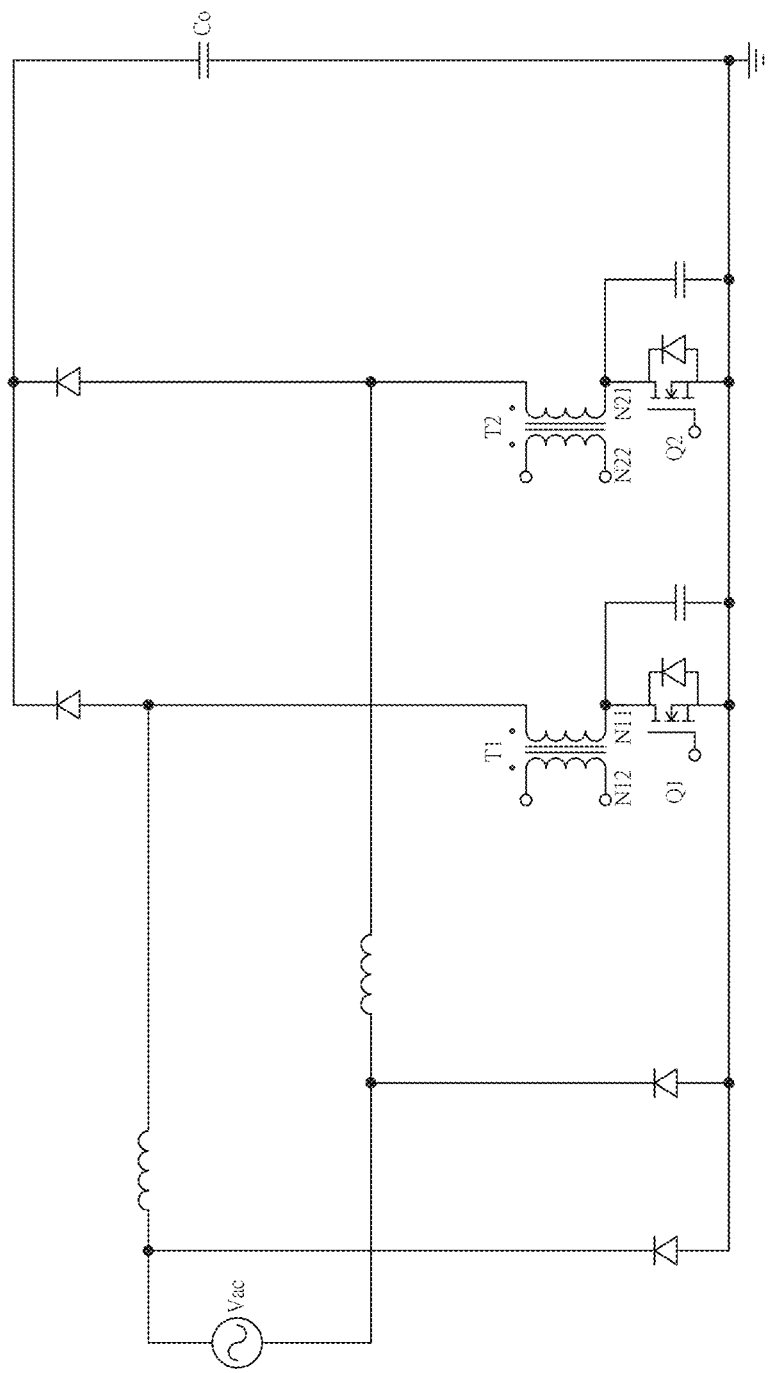
FIG. 16 is another circuit diagram of the bridgeless power factor corrector combined with the current sampling circuit of the present invention.
Figure 17A:
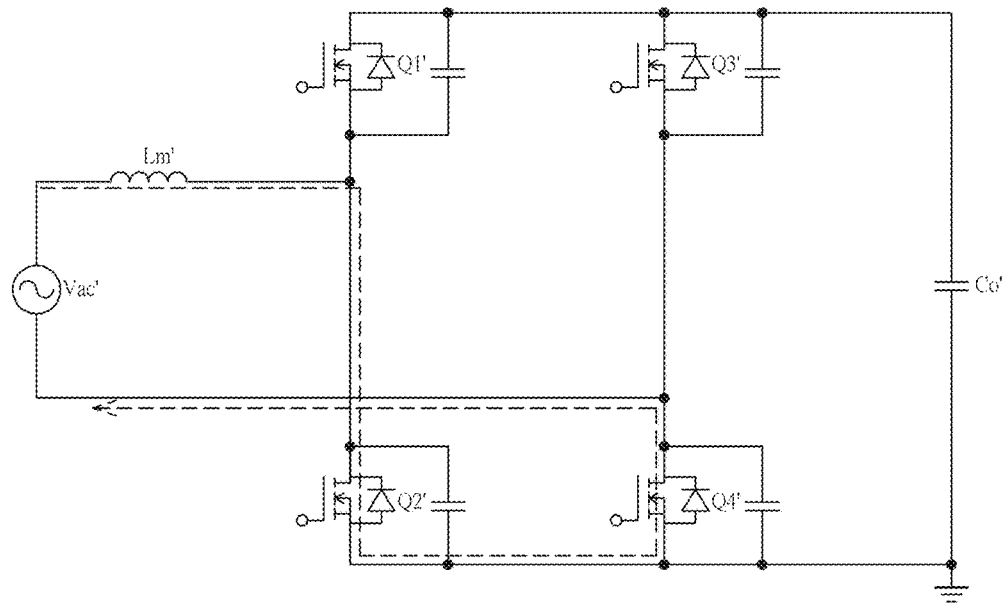
FIG. 17A to FIG. 17D are current path diagrams of circuit operation of a bridgeless totem pole power factor corrector.
Figure 17B:
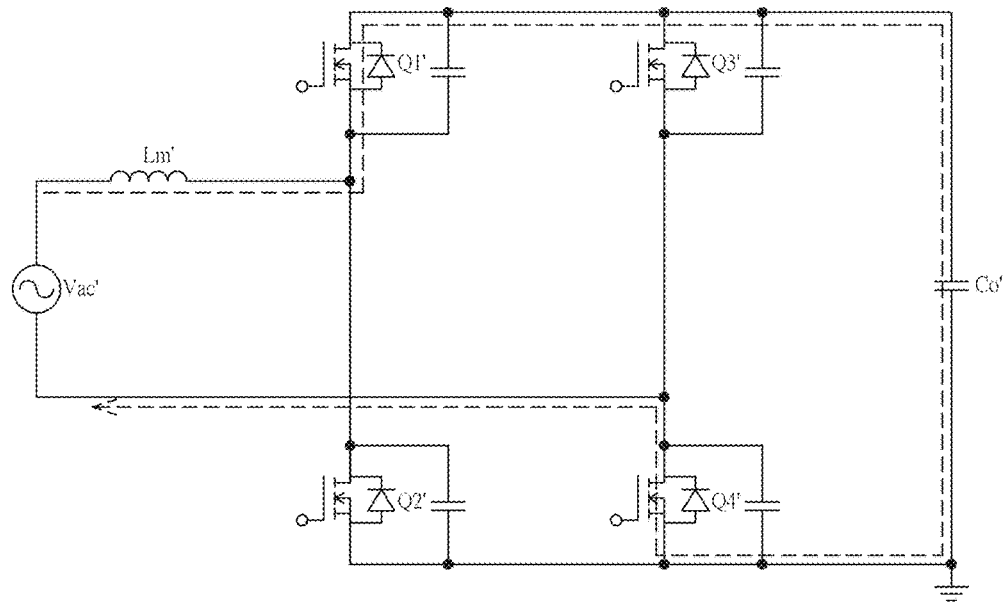
Figure 17C:
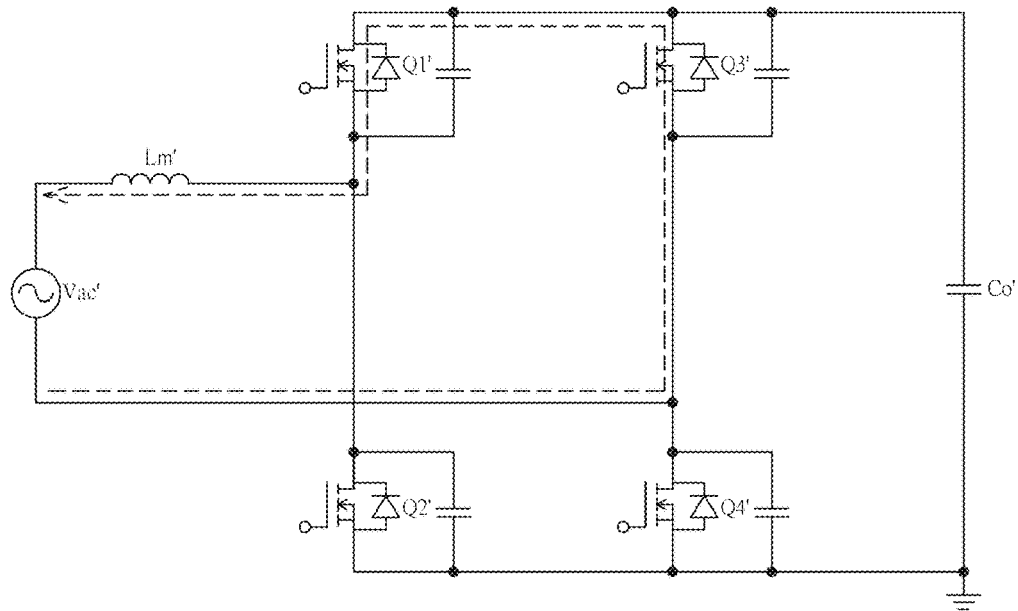
Figure 17D:
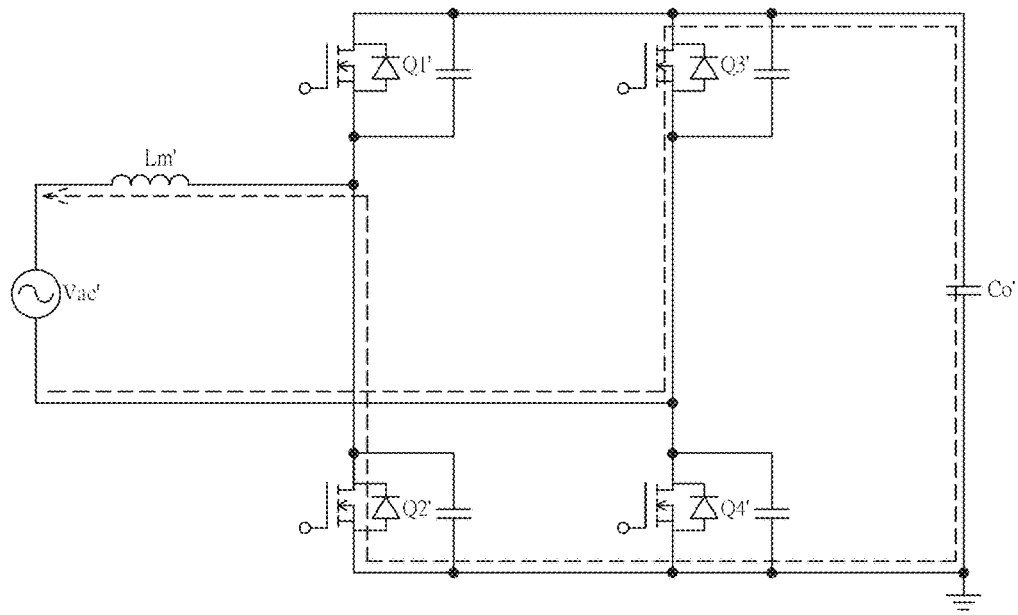
Figure 18:
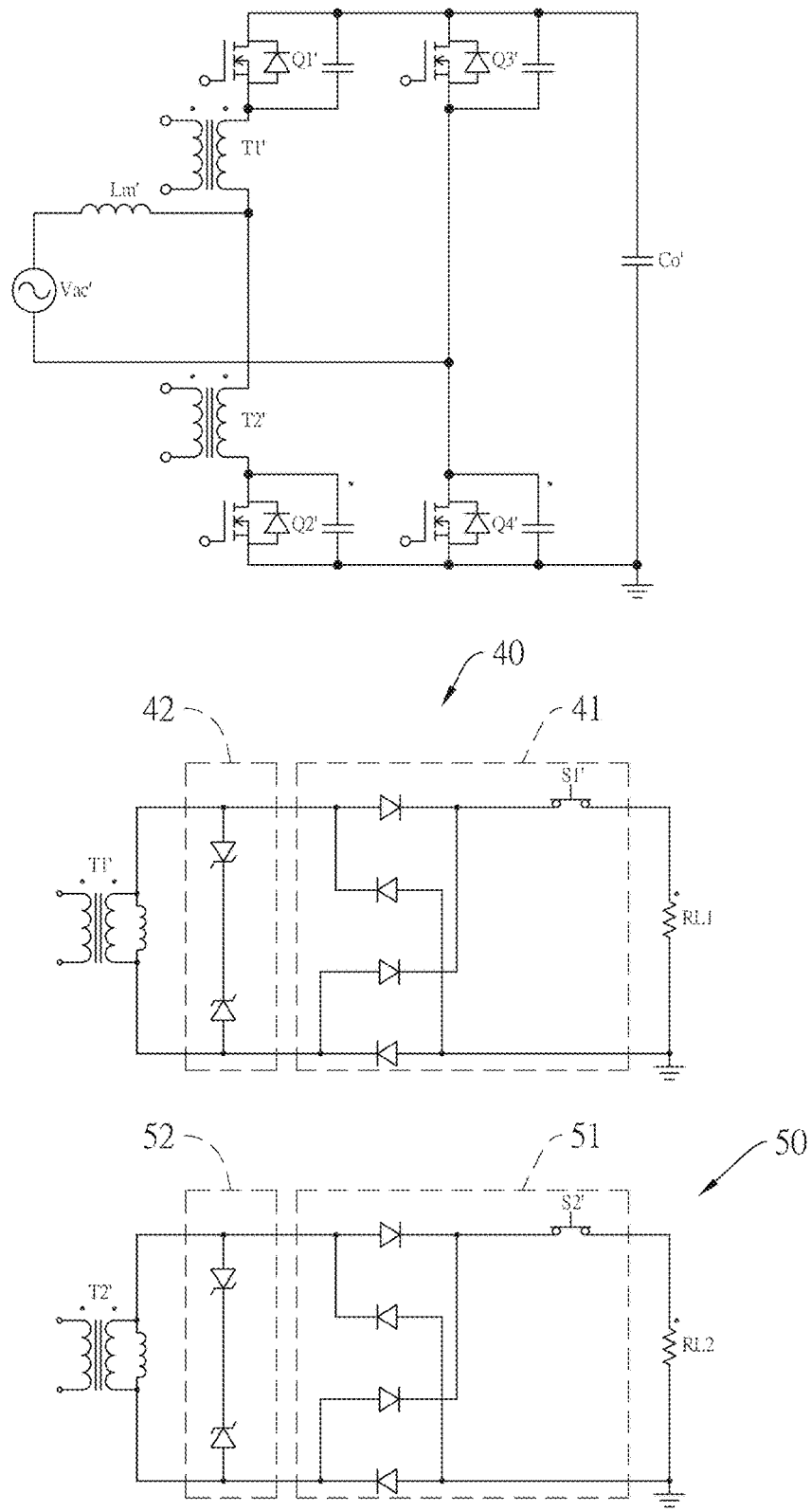
FIG. 18 is a circuit diagram of the conventional bridgeless power factor corrector and the current sampling circuit of the present invention.
Figure 19A:
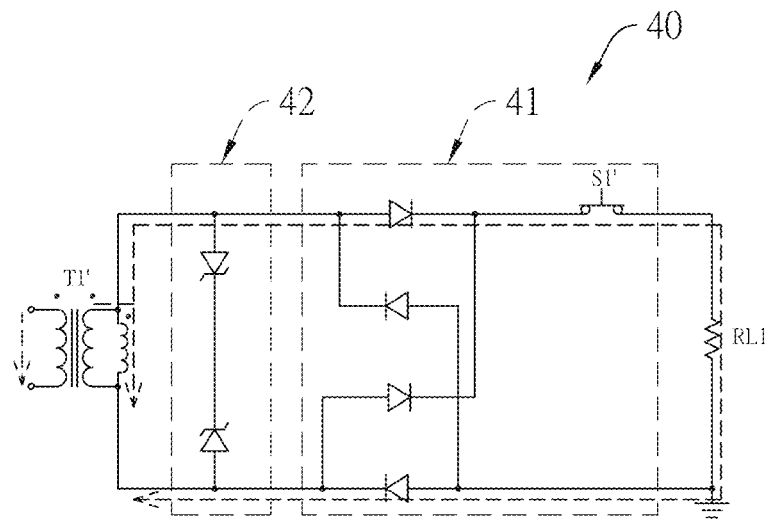
FIG. 19A to FIG. 19D are current path diagrams of circuit operation of the conventional current sampling circuit for the bridgeless power factor corrector.
Figure 19B:
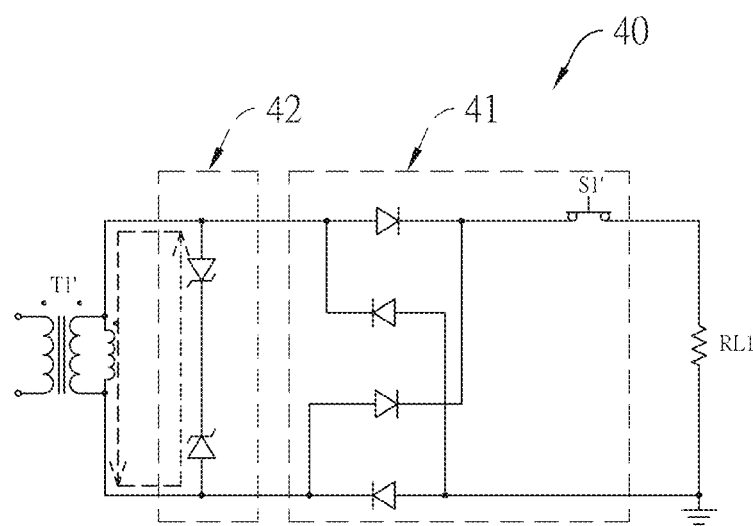
Figure 19C:
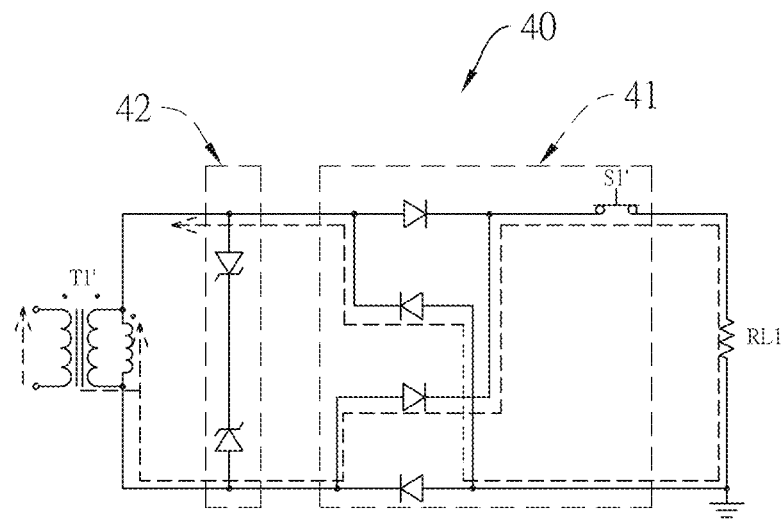
Figure 19D:
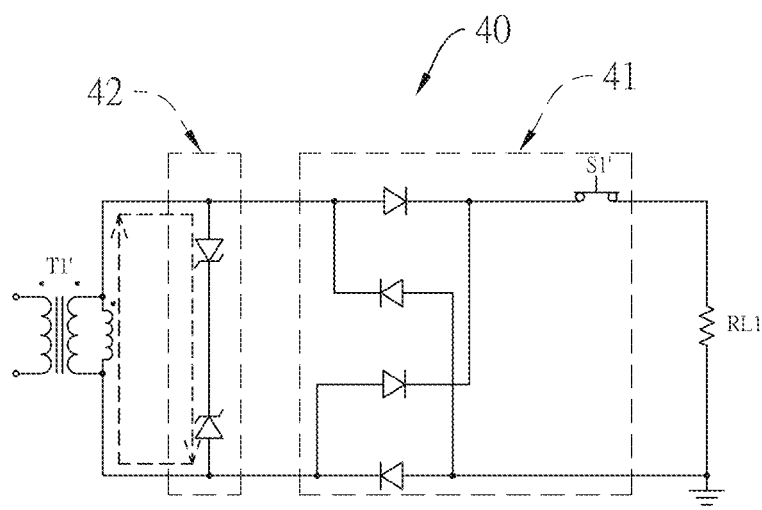

The current sampling circuit for the bridgeless PFC of the present invention is not only applicable for the bridgeless totem-pole PFC 1, but also applicable for any bridgeless PFC with different energy storage paths and energy release paths in the positive half cycle and the negative half cycle of the AC power, such as a bridgeless dual boost PFC shown in FIG. 16. In this example, the energy storage and energy release operations of the first switch S1 to the sixth switch S6 of the current sampling circuit in the positive half cycle and the negative half cycle of the AC power are the same as the operations of the bridgeless totem-pole PFC 1.

Compared with the current sampling circuit of the conventional bridgeless PFC, the current sampling circuit for the bridgeless PFC of the present invention has the following advantages:

1. The current sampling circuit uses a single sampling resistor: the present invention combines two independent sampling circuits to using only a single sampling resistor by improving a circuit topology. By eliminating the current sampling circuit behind the sampling resistor, the overall circuit complexity and a number of components of the bridgeless PFC circuit are reduced.
2. The current sampling circuit does not require the high frequency signal to control the switches: on the premise of using a sampling resistor RL, the switches of the two current sampling modules switch according to an AC frequency. The switches can directly use the GPIO of the controller without occupying high-frequency output terminals of a general controller, reducing a number of high-frequency signal terminals and improving the overall design flexibility and diversity of the bridgeless PFC. Furthermore, by avoiding the use of high-frequency switches in the current sampling circuit, high-frequency switching loss is reduced and overall efficiency of the bridgeless PFC is improved.
3. The current sampling circuit provides the resonant current freewheeling paths of the bridgeless PFC in the DCM: the present invention further provides the first resonant current freewheeling unit 14 and the second resonant current freewheeling unit 24 as the resonant current freewheeling paths of the resonant current generated by the first fast switch Q1 and the second fast switch Q2 during the DCM. By releasing the stored energy generated by the resonant current on the first transformers T1 and the second transformers T2, an offset of the sampling current can be avoided and an accurate sampling current can be measured.

What is claimed is:

1. A current sampling circuit for a bridgeless power factor corrector, being connected to the bridgeless power factor corrector, wherein the bridgeless power factor corrector is electrically connected to an AC power and has a first fast switch and a second fast switch; an energy storage current flows through the second fast switch in a positive half cycle of the AC power and flows through the first fast switch in a negative half cycle of the AC power; the current sampling circuit comprising:
- a sampling resistor;
- a first current sampling module, comprising:
  - a first transformer, comprising a first primary winding and a first secondary winding, wherein the first primary winding and the first secondary winding are coupled with each other; the first primary winding and the first fast switch are connected in series;
  - a first sampled current phase switching unit, wherein the first secondary winding is connected to the sampling resistor through the first sampled current phase switching unit; and
  - a first main current freewheeling unit, connected to the first secondary winding in parallel;
- a second current sampling module, comprising:
  - a second transformer, comprising a second primary winding and a second secondary winding, wherein the second primary winding and the second secondary winding are coupled with each other; the second primary winding and the second fast switch are connected in series;
  - a second sampled current phase switching unit, wherein the second secondary winding is connected to the sampling resistor through the second sampled current phase switching unit; and
  - a second main current freewheeling unit, connected to the second secondary winding in parallel; wherein
- in the positive half cycle of the AC power, the second sampled current phase switching unit between the second secondary winding and the sampling resistor is turned on to form a second sampling circuit, and the first main current freewheeling unit is turned on between two ends of the first secondary winding;
- in the negative half cycle of the AC power, the first sampled current phase switching unit between the first secondary winding and the sampling resistor is turned on to form a first sampling circuit, and the second main current freewheeling unit is turned on between two ends of the second secondary winding.

2. The current sampling circuit as claimed in claim 1, wherein
the first secondary winding comprises a first end and a second end, and the first sampled current phase switching unit comprises:
a first switch;
a first diode, wherein the first switch and the first diode are serially connected between the first end of the first secondary winding and one end of the sampling resistor; and
a second diode, electrically connected between another end of the sampling resistor and the second end of the first secondary winding.

3. The current sampling circuit as claimed in claim 2, wherein the first main current freewheeling unit further comprises:
a third diode; and
a second switch, serially connected to the third diode.

4. The current sampling circuit as claimed in claim 1, wherein the first current sampling module further comprises:
a first demagnetizing unit, connected to the first secondary winding in parallel.

5. The current sampling circuit as claimed in claim 1, wherein
the second secondary winding comprises a first end and a second end, and the second sampled current phase switching unit comprises:
a fourth switch;
a fourth diode, wherein the fourth switch and the fourth diode are serially connected between the first end of the second secondary winding and one end of the sampling resistor; and
a fifth diode, electrically connected between another end of the sampling resistor and the second end of the second secondary winding.

6. The current sampling circuit as claimed in claim 2, wherein the first main current freewheeling unit further comprises:
a sixth diode; and
a fifth switch, serially connected to the sixth diode.

7. The current sampling circuit as claimed in claim 2, wherein the second current sampling module further comprises:
a second demagnetizing unit, connected to the second secondary winding in parallel.

8. The current sampling circuit as claimed in claim 1, wherein
the first current sampling module further comprises:
a first resonant current freewheeling unit, connected to the first secondary winding in parallel;
the second current sampling module further comprises:
a second resonant current freewheeling unit, connected to the second secondary winding in parallel;
when the bridgeless power factor corrector operates in a discontinuous conduction mode and the AC power operates in the positive half cycle, the second resonant current freewheeling unit is turned on between two ends of the second secondary winding;
when the bridgeless power factor corrector operates in a discontinuous conduction mode and the AC power operates in the negative half cycle, the first resonant current freewheeling unit is turned on between two ends of the first secondary winding.

9. The current sampling circuit as claimed in claim 1, further comprising:
a controller, electrically connected to the first sampled current phase switching unit, the first main current freewheeling unit, the second sampled current phase switching unit and the second main current freewheeling unit; wherein
in the positive half cycle of the AC power, the controller controls the second sampled current phase switching unit to be turned on to form the second sampling circuit, controls the first main current freewheeling unit to be turned on, and controls the first sampled current phase switching unit and the second main current freewheeling unit to be turned off;
in the negative half cycle of the AC power, the controller controls the first sampled current phase switching unit to be turned on to form the first sampling circuit, controls the second main current freewheeling unit to be turned on, and controls the second sampled current phase switching unit and the first main current freewheeling unit to be turned off.

10. The current sampling circuit as claimed in claim 8, further comprising:
- a controller, electrically connected to the first resonant current freewheeling unit and the second resonant current freewheeling unit, wherein
- when the bridgeless power factor corrector operates in a discontinuous conduction mode:
- the controller controls the second resonant current freewheeling unit to be turned on and the first resonant current freewheeling unit to be turned off when the AC power operates in the positive half cycle;
- the controller controls the first resonant current freewheeling unit to be turned on and the second resonant current freewheeling unit to be turned off when the AC power operates in the negative half cycle.

* * * * *